（12) United States Patent
Umezu et al.

(10) Patent No.: US 10,985,560 B2
(45) Date of Patent: Apr. 20, 2021

(54) POWER SUPPLY SYSTEM

(71) Applicant: KAWASAKI JUKOGYO KABUSHIKI KAISHA, Kobe (JP)

(72) Inventors: Yusuke Umezu, Kakogawa (JP); Kazushige Sugimoto, Amagasaki (JP); Soichiro Bando, Kobe (JP); Naoki Yamaguchi, Akashi (JP); Kiyoshi Kimura, Ichinomiya (JP); Suguru Takayama, Kakamigahara (JP); Takato Uda, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 13 days.

(21) Appl. No.: 16/468,882

(22) PCT Filed: Dec. 26, 2017

(86) PCT No.: PCT/JP2017/046764
§ 371 (c)(1),
(2) Date: Jun. 12, 2019

(87) PCT Pub. No.: WO2018/124123
PCT Pub. Date: Jul. 5, 2018

(65) Prior Publication Data
US 2020/0083709 A1    Mar. 12, 2020

(30) Foreign Application Priority Data
Dec. 27, 2016    (JP) .............................. JP2016-254003

(51) Int. Cl.
*H02J 3/06* (2006.01)
*H02J 3/46* (2006.01)
*H02J 9/06* (2006.01)

(52) U.S. Cl.
CPC ................. *H02J 3/06* (2013.01); *H02J 3/46* (2013.01); *H02J 9/06* (2013.01)

(58) Field of Classification Search
CPC ........ H02J 3/06; H02J 3/46; H02J 9/06; H02J 1/106; H02J 2310/44; B64D 2221/00;
(Continued)

(56) References Cited

U.S. PATENT DOCUMENTS 6,188,591 B1    2/2001  Ruter et al.
2014/0265606 A1*  9/2014  Gazit ..................... H02J 7/022
307/82

FOREIGN PATENT DOCUMENTS

JP    4725010 B2    7/2011

\* cited by examiner

*Primary Examiner* — John W Poos
(74) *Attorney, Agent, or Firm* — Oliff PLC

(57) ABSTRACT

Each of the plurality of generators is configured so a relationship of frequency with respect to a generator active power output by each generator to the corresponding alternating-current wiring unit has a predetermined first drooping characteristic. The plurality of power conversion devices is configured to convert alternating-current power input through each alternating-current wiring unit into direct-current power, and to convert direct-current power input through the direct-current wiring unit into alternating-current power. The control device is configured to determine a target value of a control element such that a relationship of frequency with respect to a power conversion device active power output by each power conversion device to the corresponding alternating-current wiring unit has a predetermined second drooping characteristic, and is configured to generate a drive signal for each power conversion device by correcting a target value of the control element in response to direct-current voltage at the direct-current wiring unit.

10 Claims, 17 Drawing Sheets

(58) Field of Classification Search
CPC .... B64D 41/00; H02M 2001/008; H02P 9/00; H02P 9/04
See application file for complete search history.

[Fig. 1]
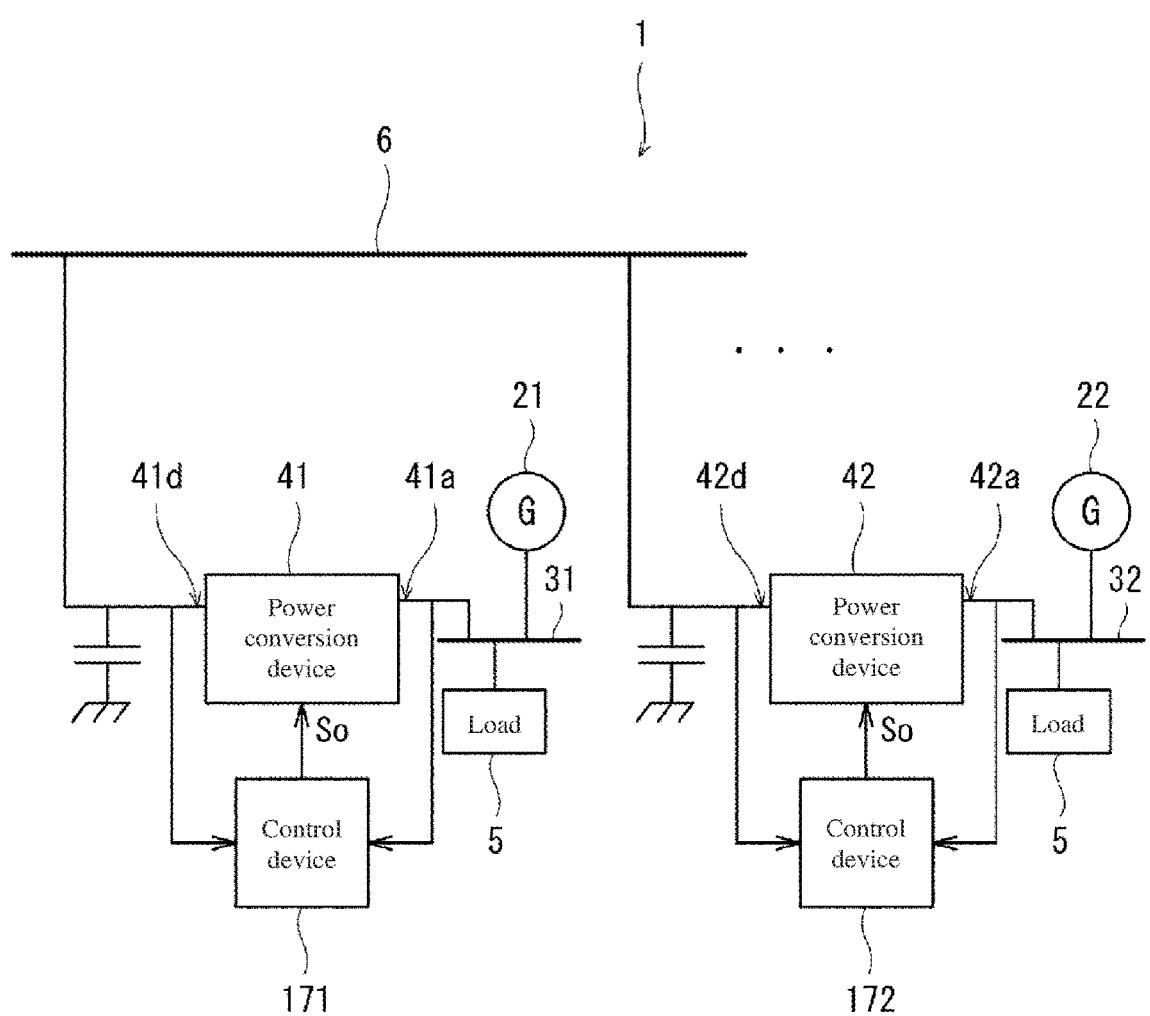

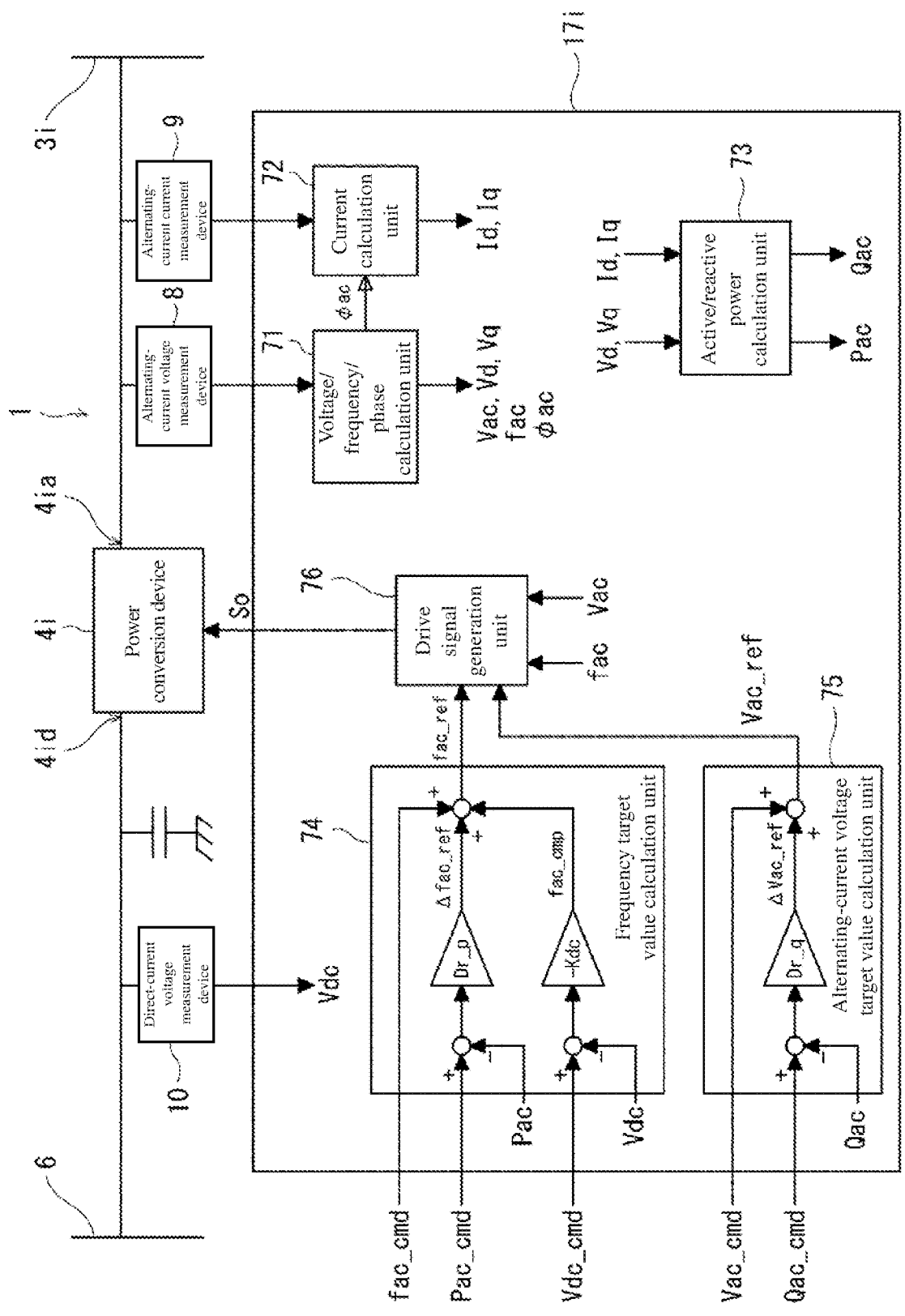
[Fig. 2]

[Fig. 3]
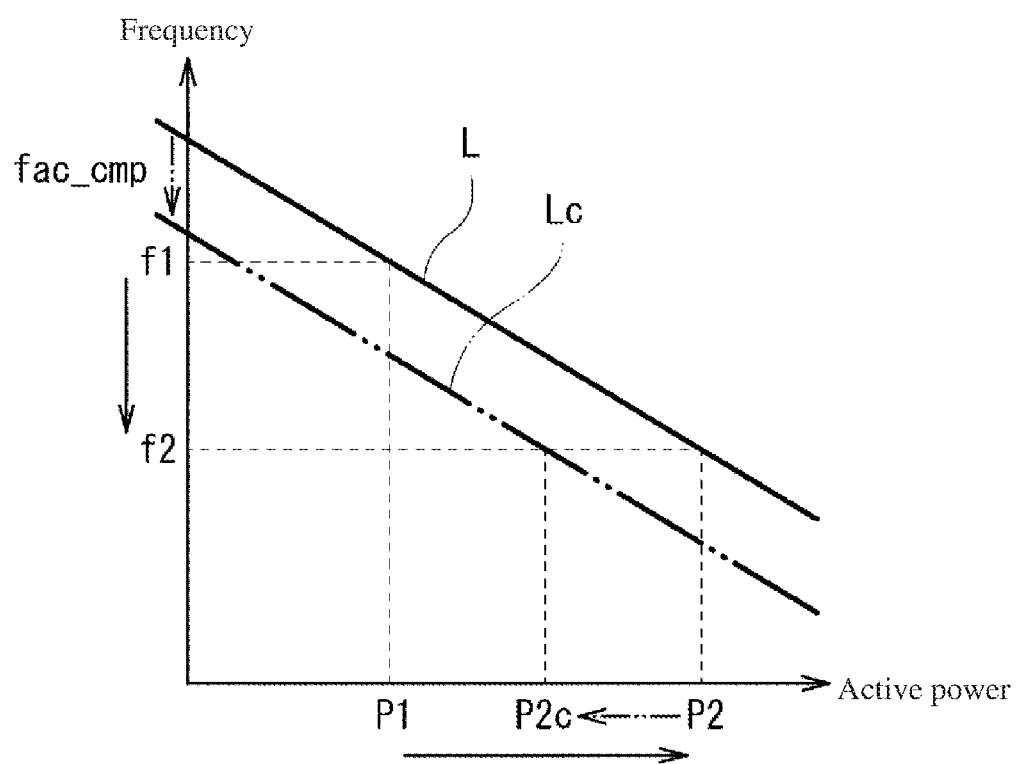

[Fig. 4]
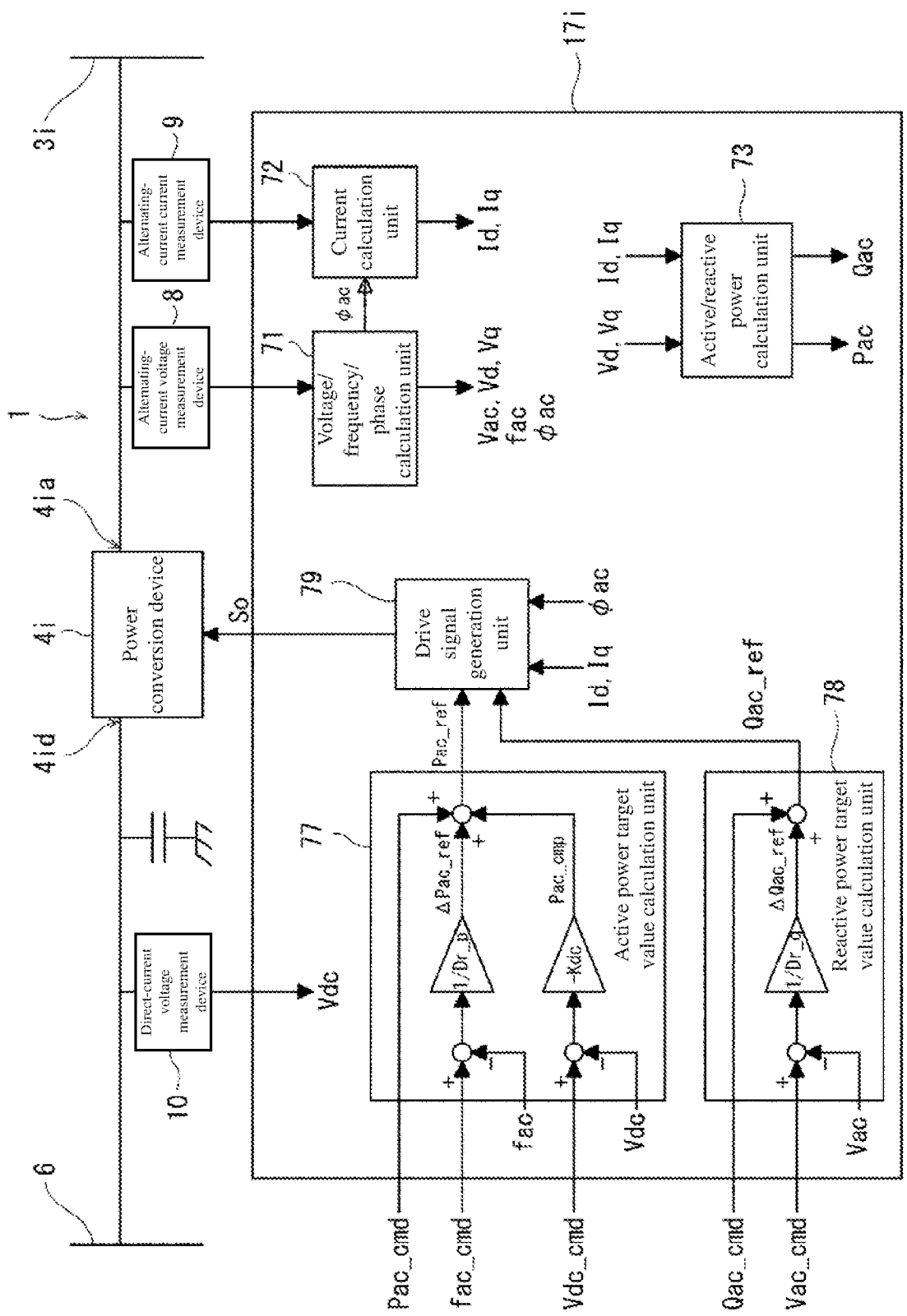

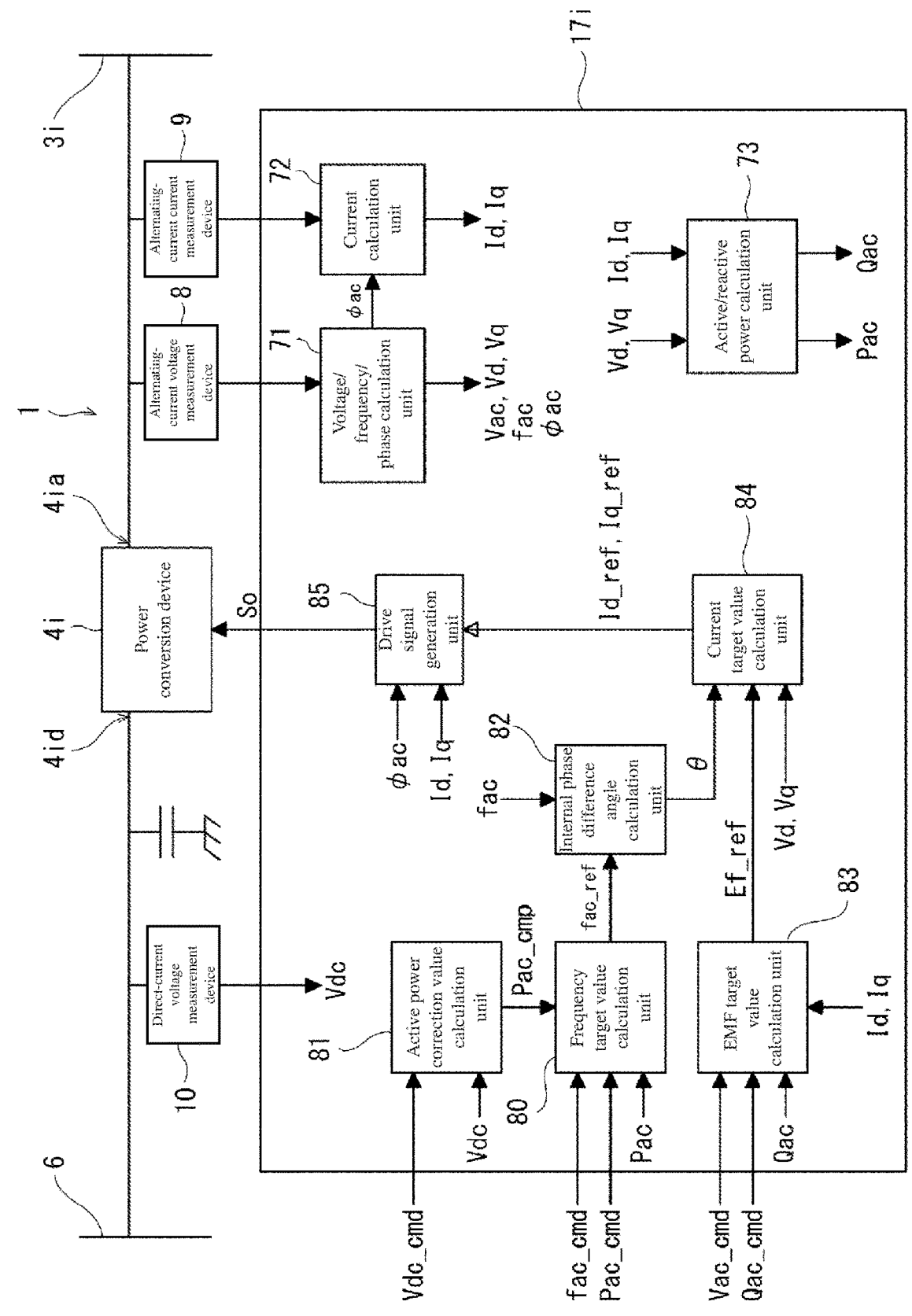
[Fig. 5]

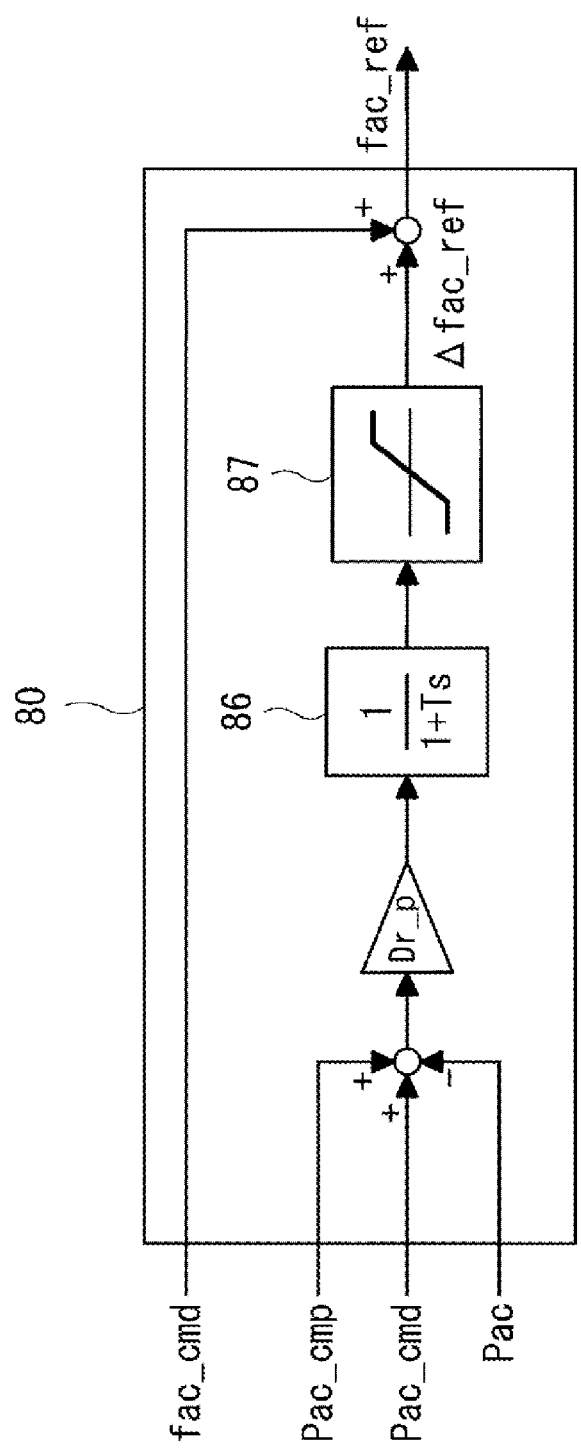
[Fig. 6]

[Fig. 7]
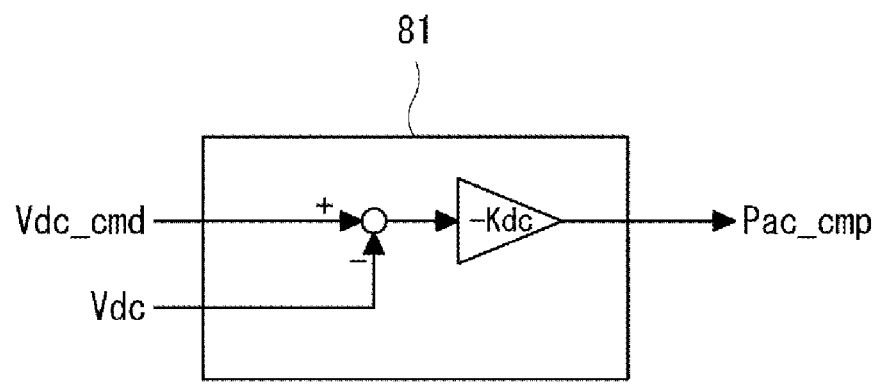
[Fig. 8]
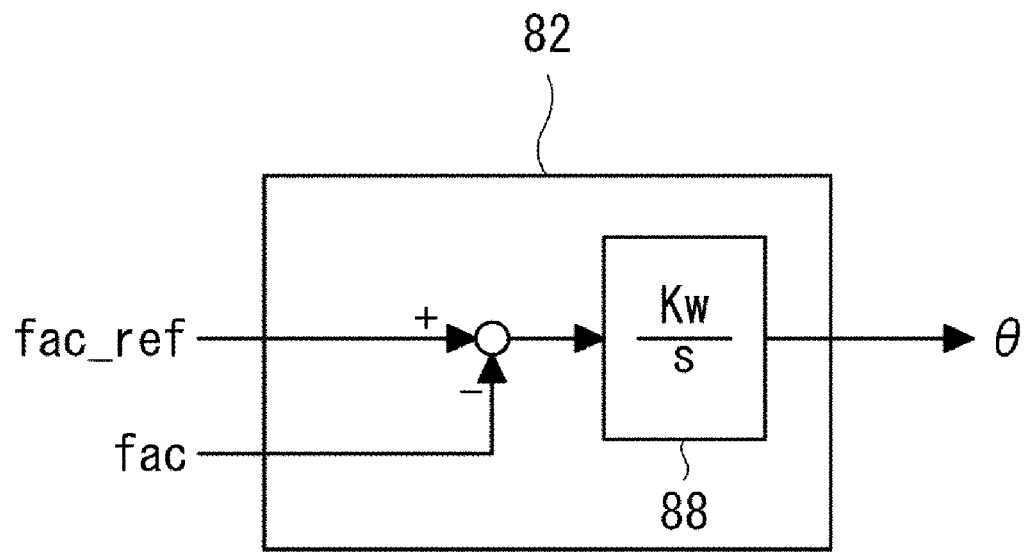

[Fig. 9]
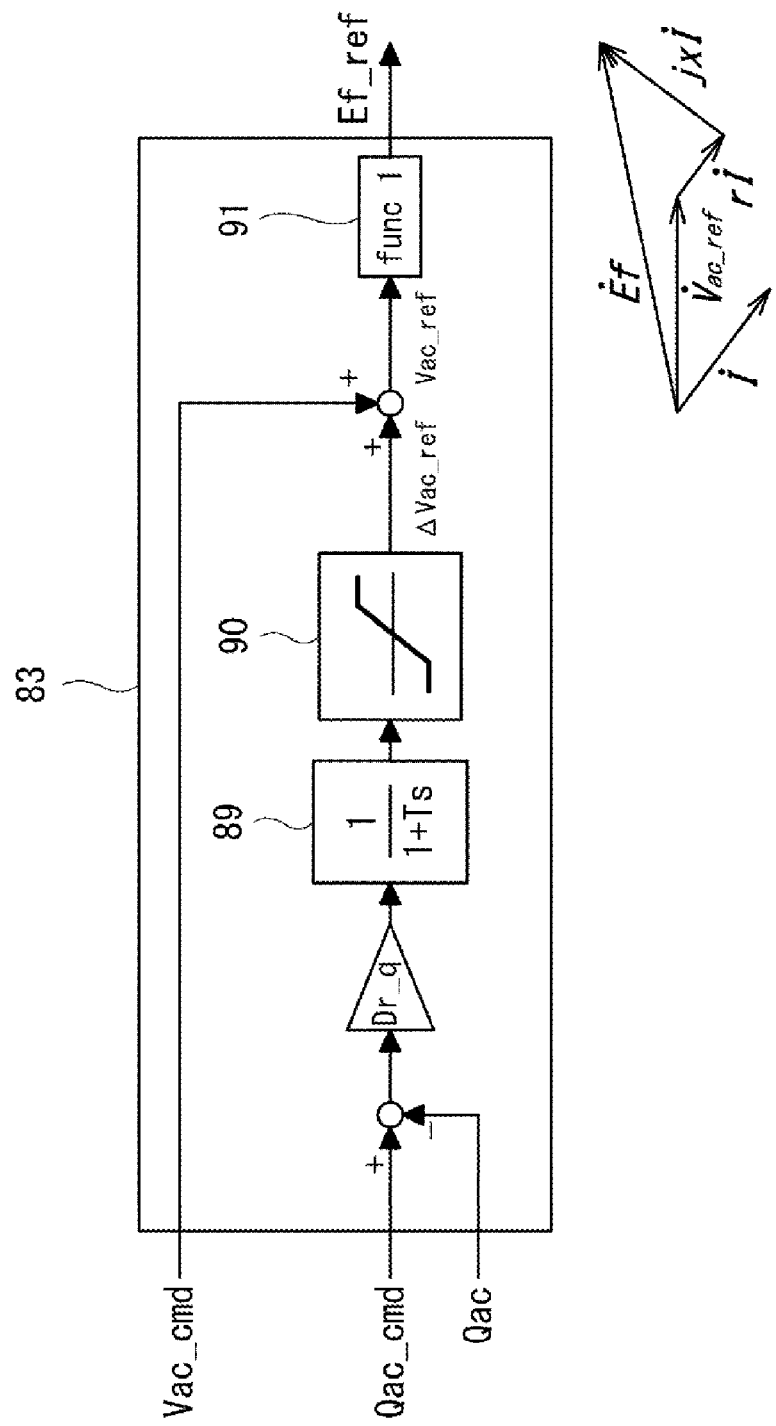

[Fig. 10]
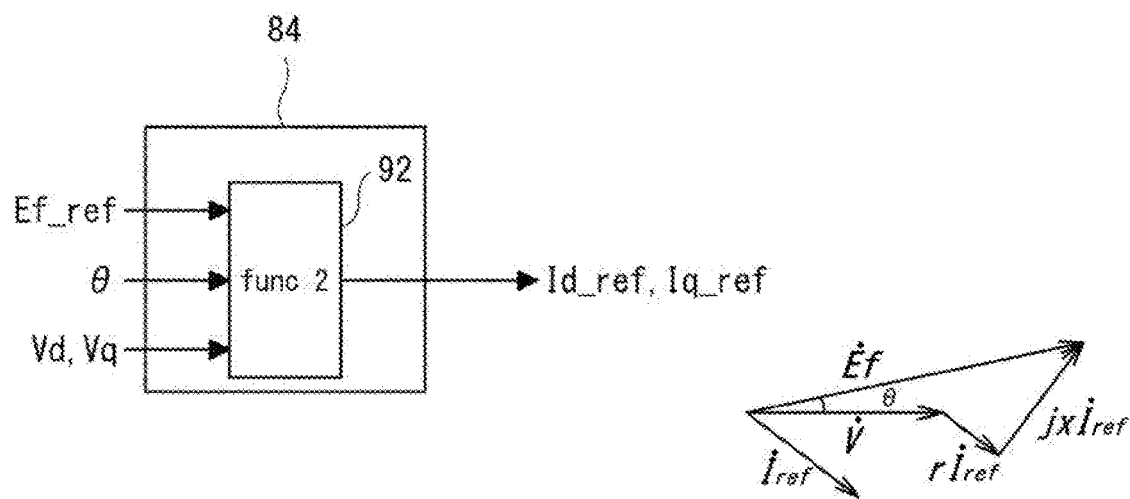
[Fig. 11]
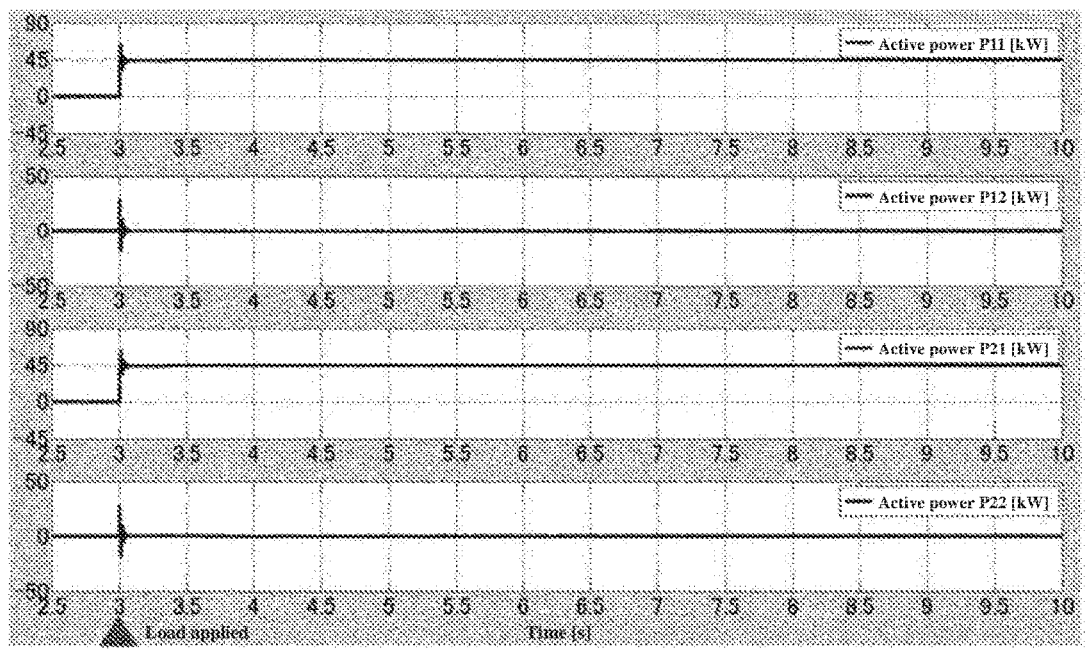

[Fig. 12]
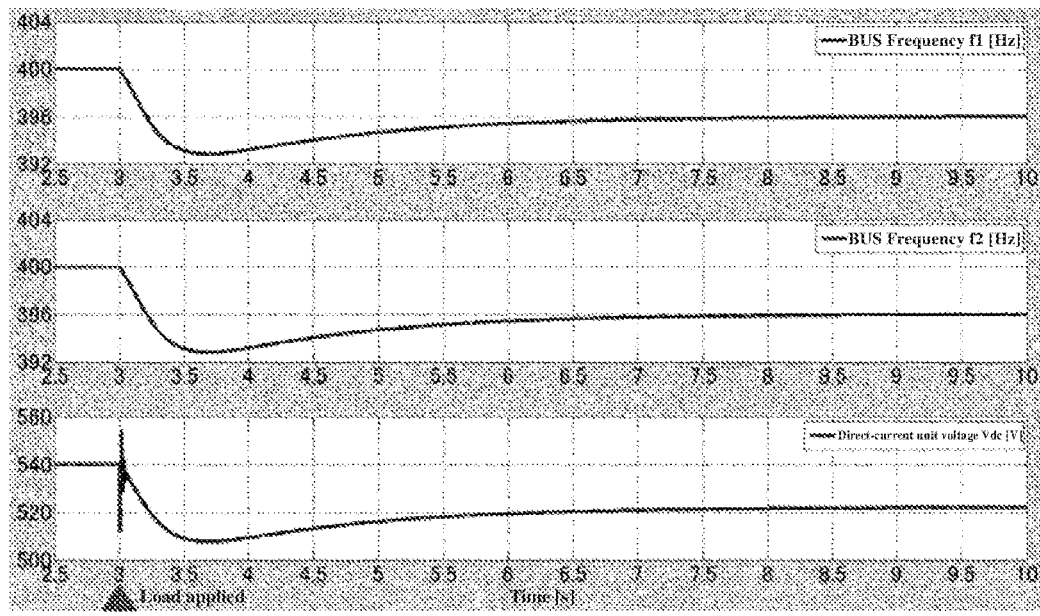
[Fig. 13]
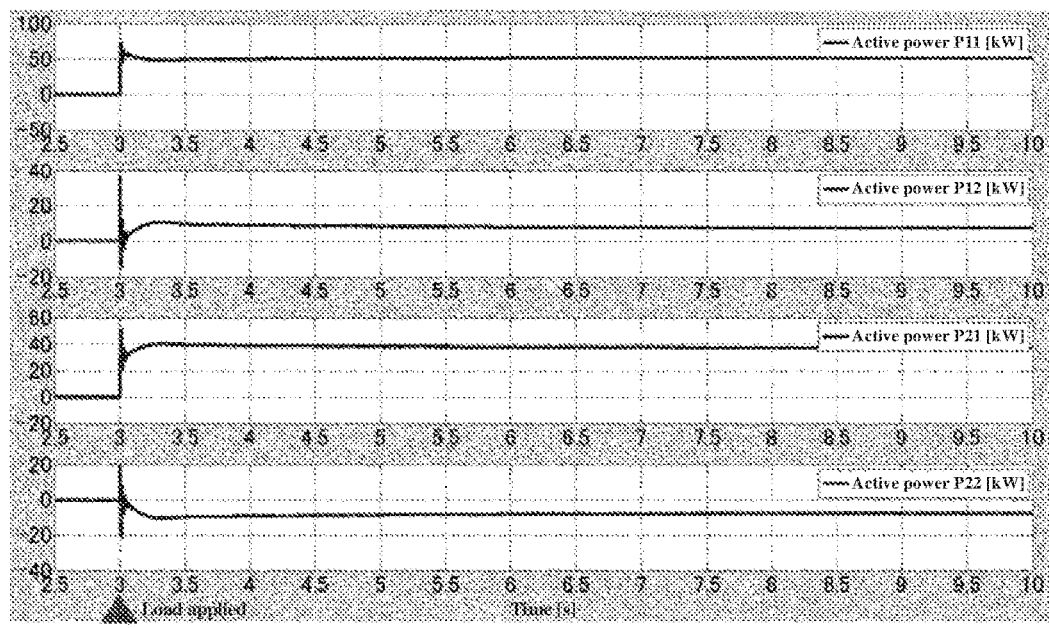

[Fig. 14]
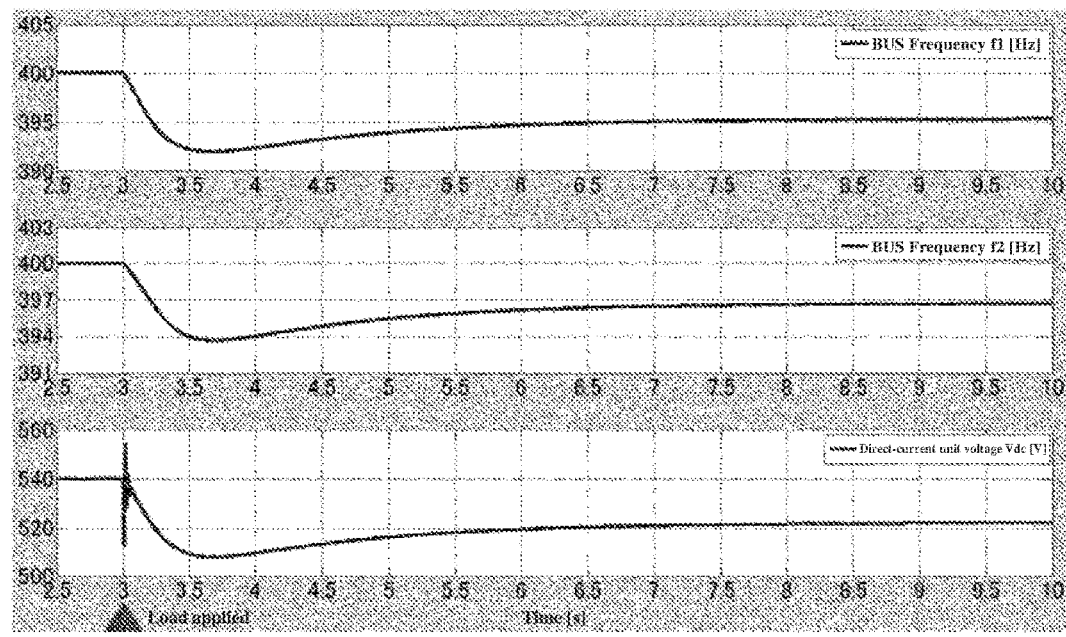
[Fig. 15]
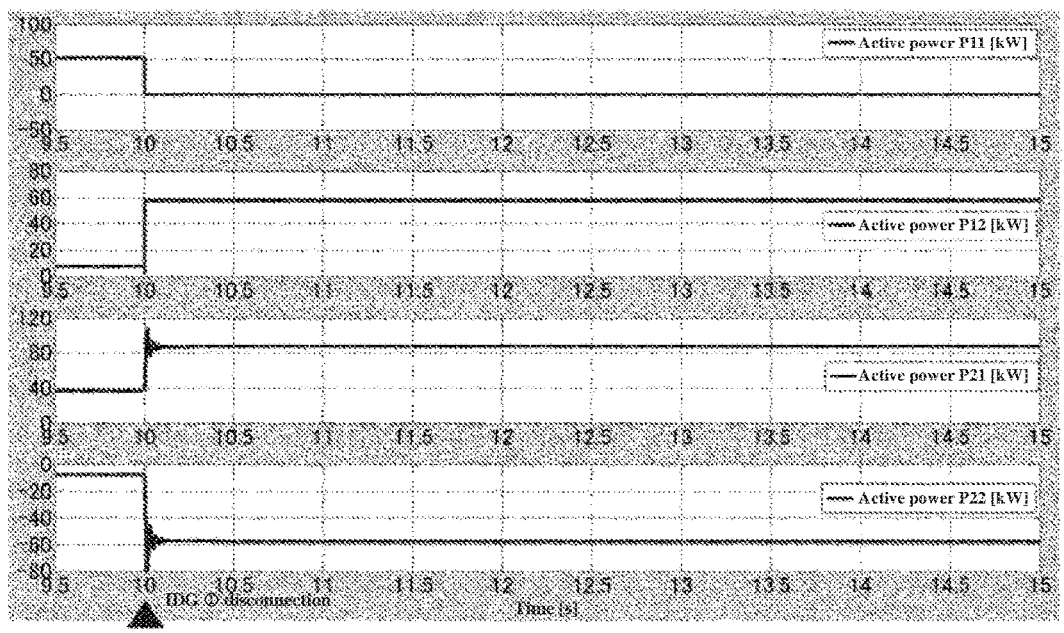

[Fig. 16]
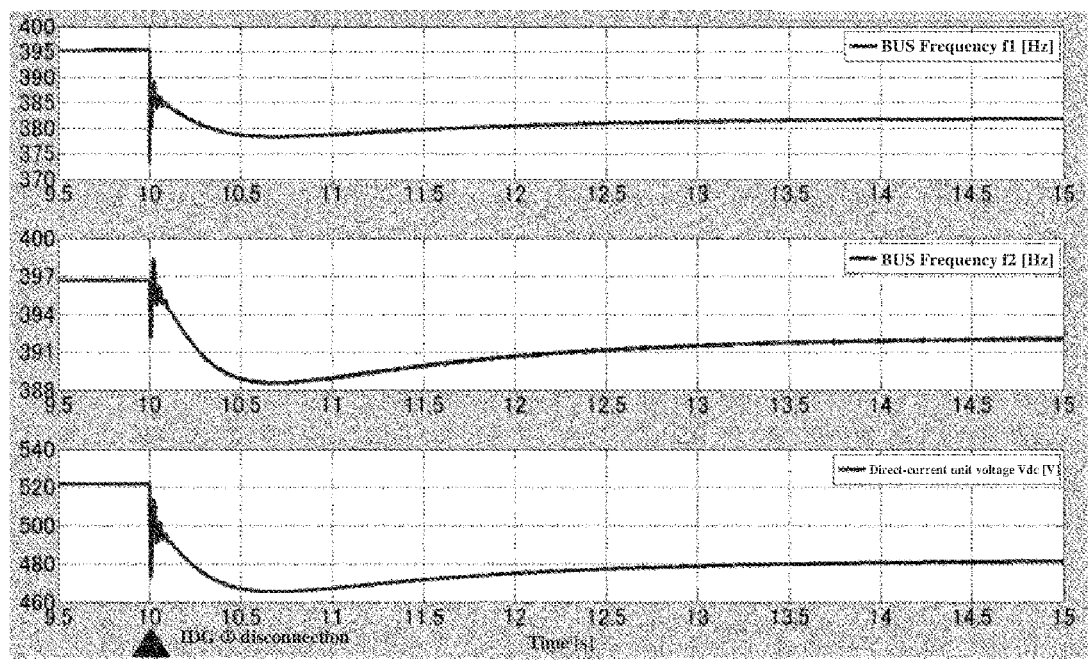

[Fig. 17]
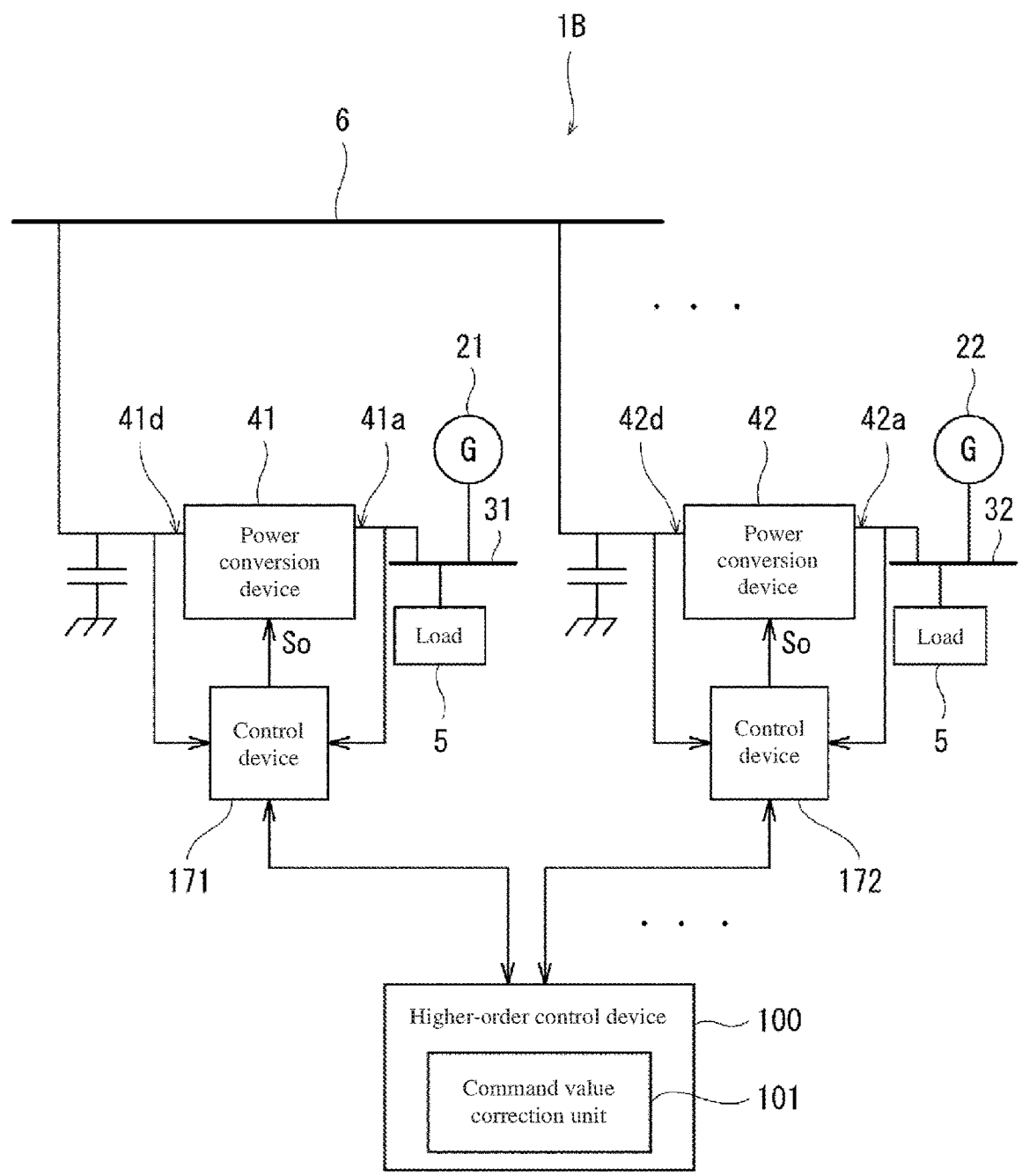

[Fig. 18]
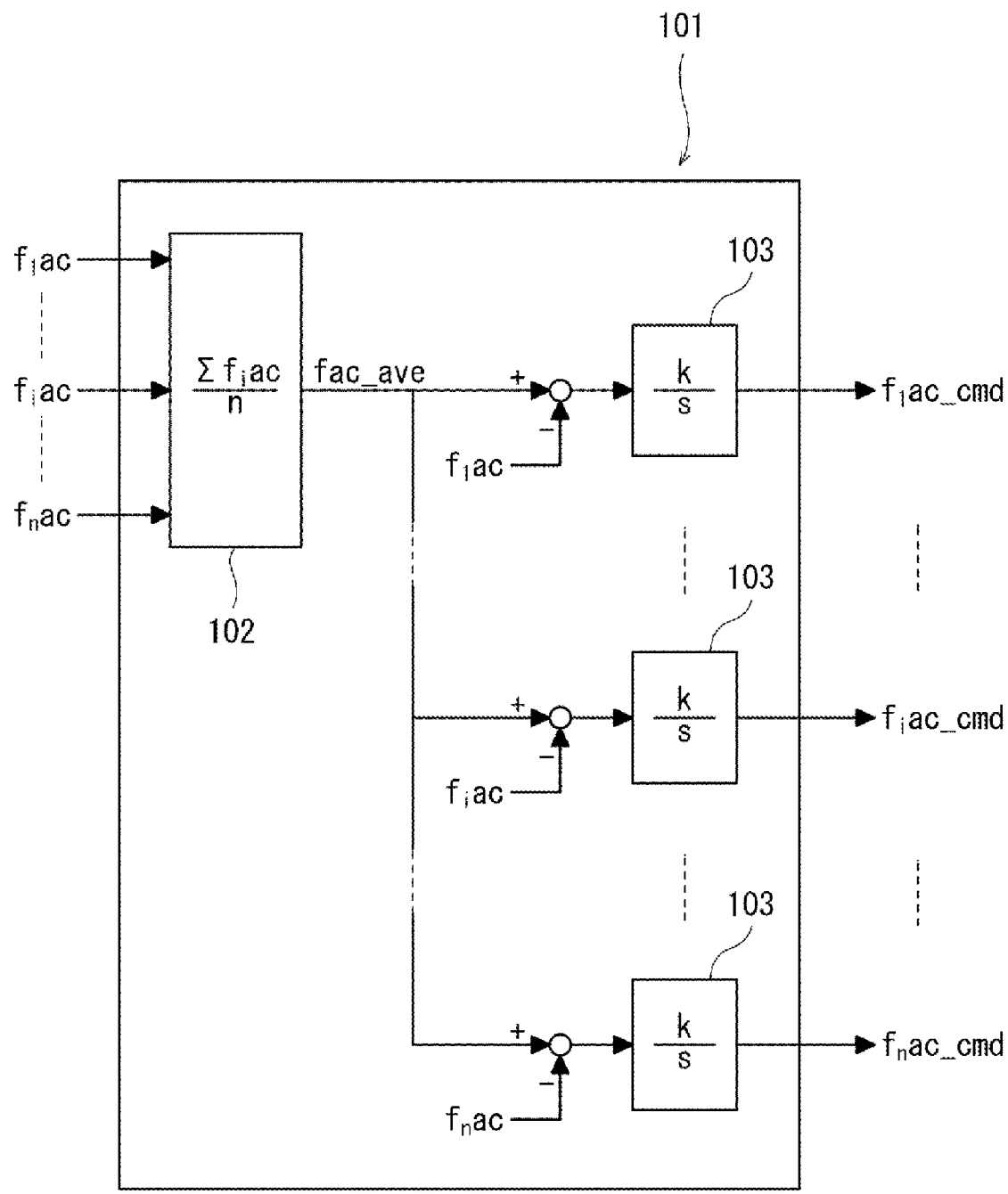

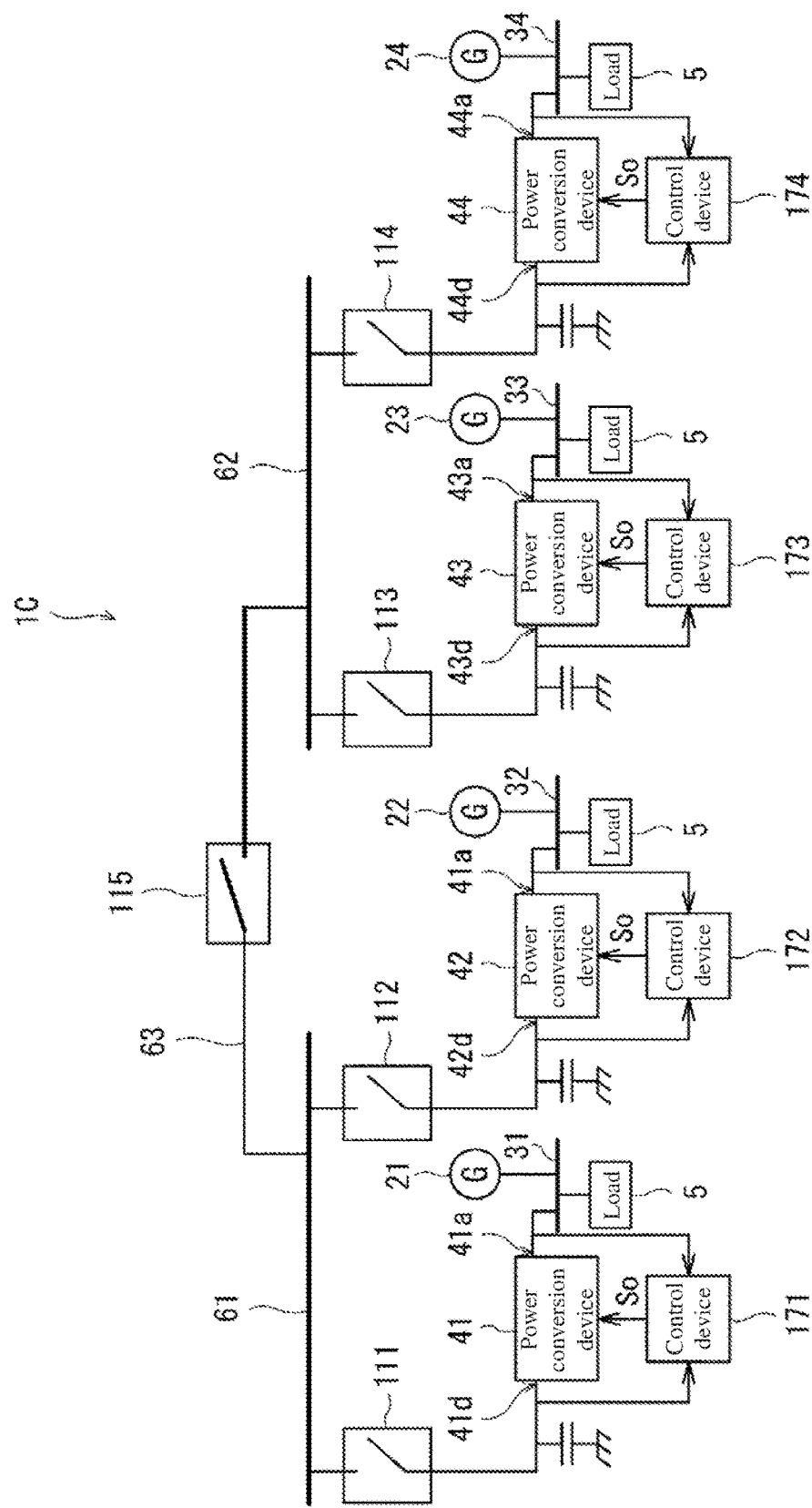
[Fig. 19]

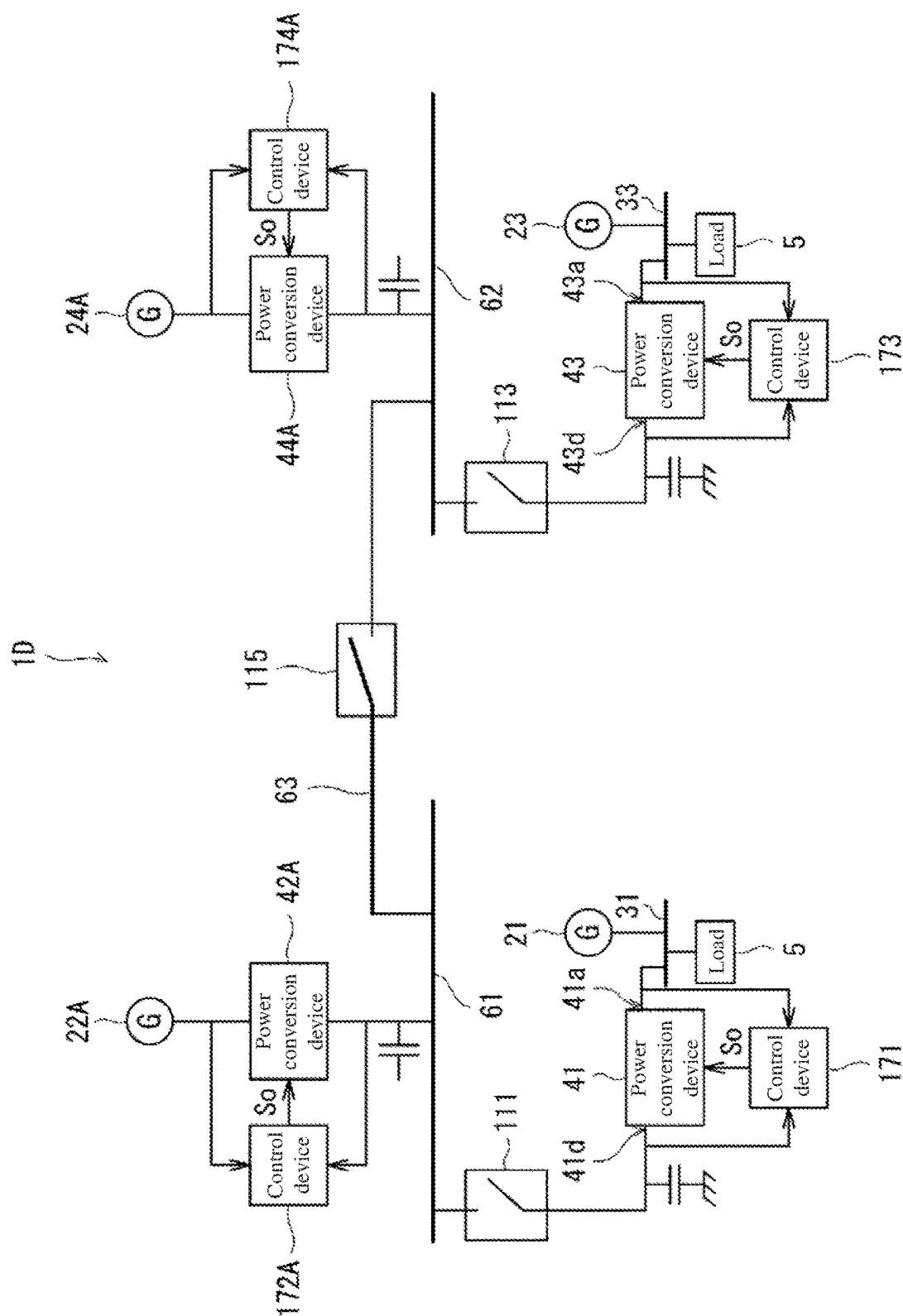
[Fig. 20]

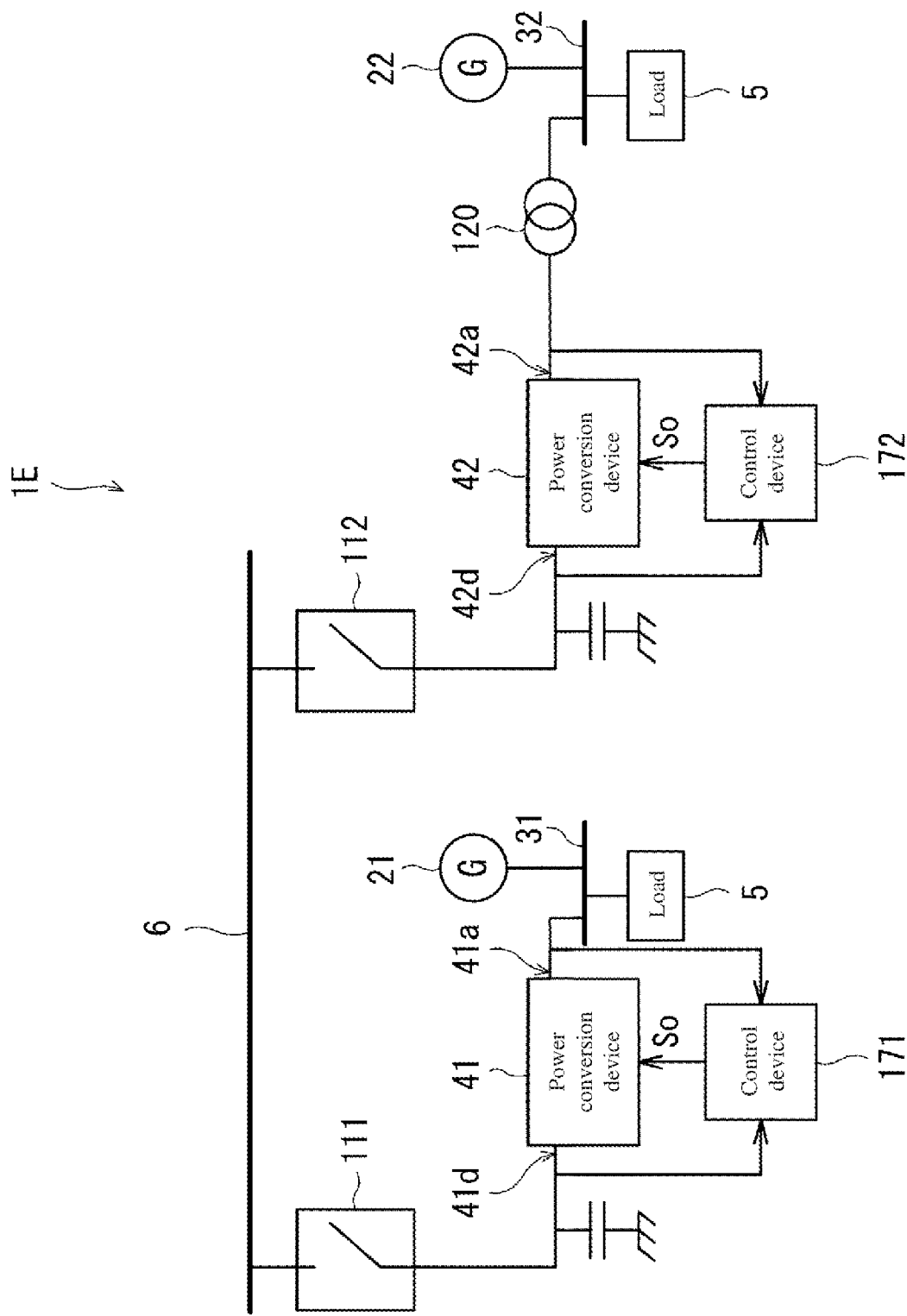
[Fig. 21]

POWER SUPPLY SYSTEM

TECHNICAL FIELD

The present invention relates to a power supply system.

BACKGROUND ART

A power supply system used for, e.g., an aircraft and the like that is provided with a plurality of generators has been known. Such power supply systems are roughly classified into a split method, a parallel operation method, a BTB (back to back) method, and the like.

The split method is configured such that a plurality of generators are connected to alternating-current (AC) wiring units (power supplies BUS) independent of one another, and one generator supplies power to loads connected to the respective power supplies BUS. In the split method, since only one generator is connected to one power supply BUS, when one generator is stopped for some reason such as a failure, a load (wiring system) to be connected to the corresponding power supply BUS enters a temporary power outage state. In the split method, when one generator is stopped, a switching process is performed to connect the corresponding power supply BUS to another power supply BUS or an auxiliary power unit (APU), and this allows power supply in the corresponding power supply BUS to be continued, but the temporary power outage state is inevitable. Accordingly, depending on the load connected to the power supply BUS, the operation can not be continued, and a process such as restart may be required.

On the other hand, in the parallel operation method, a plurality of generators are connected to one power supply BUS. Accordingly, even if one generator is stopped, other generators continue to supply power, and it is thus possible to avoid the wiring system including the power supply BUS from entering a power outage state. However, in the parallel operation method, when a wiring abnormality such as a short circuit or a ground fault occurs in the wiring system, the influence spreads over the entire wiring system, and the entire wiring system is in a power outage state until the part where the wiring abnormality occurred is removed, resulting in failure of performing normal power feeding. In particular, in a power supply system mounted on an aircraft, it should be avoided that power is all lost even temporarily. It is necessary to take additional measures such as combined usage of another power supply system such as a direct-current (DC) power supply system.

In the BTB method, a power conversion device is connected to each power supply BUS in the split method. Each power conversion device is configured to convert alternating-current power of the power supply BUS into direct-current power, and direct-current units of the power conversion devices corresponding to respective power supply BUSes are connected to one another. In the BTB method, each power conversion device performs power adjustment to the power supply BUS based on the alternating-current voltage of the corresponding power supply BUS, and a predetermined one of the plurality of power conversion devices connected to one another in the direct-current unit performs power adjustment to the power supply BUS based on the voltage of the direct-current unit.

As described above, in the BTB method, among the plurality of power conversion devices, the power conversion device that performs power adjustment to the power supply BUS based on the voltage of the direct-current unit is predetermined. Accordingly, when a power outage state occurs in the power supply BUS corresponding to the power conversion device that performs control based on the voltage of the direct-current unit, it becomes impossible to perform power adjustment among the plurality of power conversion devices. In other words, the BTB method is not a system for which occurrence of a power outage state is assumed.

Furthermore, there is a proposed configuration where a plurality of power conversion devices such as those of the BTB method are connected by a direct-current unit, the configuration where occurrence of abnormality in the generator is detected, and when occurrence of the abnormality is detected, the control mode is switched before a wiring system including the corresponding power supply BUS enters a power outage state, and hence the wiring system is prevented from entering a power outage state (for example, see Patent Literature 1).

CITATION LIST

Patent Literature

PTL 1: U.S. Pat. No. 4,725,010

SUMMARY OF INVENTION

Technical Problem

However, in the system as described in Patent Literature 1, it is necessary to prepare two control modes and switch them after detecting whether they are in a failure state. Accordingly, the system becomes complicated.

In the system as described in Patent Literature 1, power exchange between the plurality of power supplies BUS is not performed in a normal state. For this reason, as in the parallel operation method or the BTB method, power exchange can not be performed among the plurality of power supplies BUS, and load balance of the generator can not be performed independently. In the method as described in Patent Literature 1, it is difficult to suppress the voltage or frequency change at the time of a sudden change in load and to secure an appropriate power supply quality.

The present invention is to solve the above problems, and it is an object to provide a power supply system in which a plurality of wiring units each including at least one generator are connected to one another, the power supply system capable of continuing power supply to each wiring unit when an abnormality occurs in one generator, and capable of not affecting other wiring units when an abnormality occurs in part of the wiring units.

Solution to Problem

A power supply system according to an aspect of the present invention is a power supply system including: a plurality of alternating-current wiring units respectively connected to the plurality of generators; a plurality of power conversion devices respectively connected to the plurality of alternating-current wiring units; a direct-current wiring unit connecting the plurality of power conversion devices to one another; and a control device that performs power conversion control between a corresponding alternating-current wiring unit and the direct-current wiring unit by transmitting a drive signal to the plurality of power conversion devices, in which each of the plurality of generators is configured such that a relationship of frequency with respect to a generator active power output by each generator to the corresponding alternating-current wiring unit has a predetermined first drooping characteristic, the plurality of power conversion devices is configured to convert alternating-current power input through each alternating-current wiring unit into direct-current power, and to convert direct-current power input through the direct-current wiring unit into alternating-current power, and the control device is configured to determine a target value of a control element such that a relationship of frequency with respect to a power conversion device active power output by each power conversion device to the corresponding alternating-current wiring unit has a predetermined second drooping characteristic, and is configured to generate the drive signal for each power conversion device by correcting the target value of the control element in response to direct-current voltage at the direct-current wiring unit.

According to the above configuration, the generator has the first drooping characteristic, and the target value of the control element for alternating-current/direct-current conversion in the power conversion device is determined such that a relationship of frequency with respect to a power conversion device active power output by each power conversion device to the corresponding alternating-current wiring unit has the second drooping characteristic. Thus, it is possible to exchange power between the plurality of wiring units in response to a change in active power in the alternating-current wiring unit associated with a load change. Furthermore, the target value of the control element is corrected in response to direct-current voltage in the direct-current wiring unit. As a result, it is possible to suppress an excessive decrease or increase in the direct-current voltage, and to balance the exchange of power among the plurality of power conversion devices connected by the common direct-current wiring unit. In this manner, since each of the plurality of power conversion devices executes the same control mode while taking into consideration direct-current voltage in the direct-current wiring unit, the power output at each alternating-current wiring unit is controlled. Accordingly, it is possible to continue power supply to each wiring unit when abnormality occurs in one generator while executing the same control mode regardless of the presence or absence of abnormality of the generator or the wiring unit. It is also possible not to affect other wiring units when abnormality occurs in part of the wiring unit.

The control device may be configured to determine a target value of the control element such that a relationship of alternating-current voltage with respect to a power conversion device reactive power that each power conversion device outputs to the corresponding alternating-current wiring unit has a predetermined third drooping characteristic. According to this, not only power conversion device active power output by the power conversion device but also power conversion device reactive power output by the power conversion device is controlled using the drooping characteristic. Accordingly, it is possible to exchange power among the plurality of wiring units in response to a change in reactive power associated with the load change.

The control device may include a frequency target value calculation unit that calculates a frequency target value by a frequency target value calculation process including a calculation of multiplying a value based on a deviation of the power conversion device active power with respect to a predetermined active power command value by a coefficient indicating the second drooping characteristic.

The frequency target value calculation unit may calculate a frequency reference value obtained by multiplying a value based on a deviation of the power conversion device active power with respect to the active power command value by a coefficient indicating the second drooping characteristic, calculate a frequency correction value obtained by multiplying a deviation of the direct-current voltage with respect to a predetermined direct-current voltage command value by a predetermined correction coefficient, and calculate the frequency target value obtained by adding the frequency reference value and the frequency correction value to a predetermined frequency command value.

The frequency target value calculation unit may calculate an active power correction value obtained by multiplying a deviation of the direct-current voltage with respect to a predetermined direct-current voltage command value by a predetermined correction coefficient, and perform a calculation of multiplying a value obtained by adding the active power correction value to a deviation of the power conversion device active power with respect to the active power command value by a coefficient indicating the second drooping characteristic.

The control device may include an active power target value calculation unit that calculates an active power target value by an active power target value calculation process including a calculation of multiplying a value based on a deviation of the frequency with respect to a predetermined frequency command value by a coefficient indicating the second drooping characteristic.

The active power target value calculation unit may calculate an active power reference value obtained by multiplying a value based on a deviation of the frequency with respect to the frequency command value by a coefficient indicating the second drooping characteristic, calculate an active power correction value obtained by multiplying a deviation of the direct-current voltage with respect to a predetermined direct-current voltage command value by a predetermined correction coefficient, and calculate the active power target value obtained by adding the active power reference value and the active power correction value to a predetermined active power command value.

The control device may include an alternating-current voltage target value calculation unit that calculates an alternating-current voltage target value by an alternating-current voltage target value calculation process including a calculation of multiplying a value based on a deviation of the power conversion device reactive power with respect to a predetermined reactive power command value by a coefficient indicating the third drooping characteristic.

The control device may include a reactive power target value calculation unit calculating a reactive power target value by a reactive power target value calculation process including a calculation of multiplying a value based on a deviation of the alternating-current voltage with respect to a predetermined alternating-current voltage command value by a coefficient indicating the third drooping characteristic.

The control device may include a command value correction unit that corrects a command value of the control element serving as a reference of a target value of the control element based on a value obtained by averaging the frequencies of the plurality of alternating-current wiring units such that an output of each generator becomes equal to each other. According to this, it is possible to balance outputs of the plurality of generators while appropriately exchanging the power among the plurality of wiring units.

These and other objects, features, and advantages of the present invention will become apparent from the following detailed description of the preferred embodiments with reference to the accompanying drawings.

Advantageous Effects of Invention

According to the present invention, in a power supply system in which a plurality of wiring units each including at least one generator are connected to one another, the power supply system is capable of continuing power supply to each wiring unit when an abnormality occurs in one generator, and capable of not affecting other wiring units when an abnormality occurs in part of the wiring units.

BRIEF DESCRIPTION OF DRAWINGS

FIG. 1 is a block diagram showing a schematic configuration of a power supply system according to Embodiment 1 of the present invention.

FIG. 2 is a block diagram showing a schematic configuration of a control system when a control device of a power conversion device in the power supply system shown in FIG. 1 is a voltage control type control device.

FIG. 3 is a graph showing a second drooping characteristic in the present embodiment.

FIG. 4 is a block diagram showing a schematic configuration of a control system when the control device of the power conversion device in the power supply system shown in FIG. 1 is a current control type control device.

FIG. 5 is a block diagram showing a schematic configuration of a control system when the control device of the power conversion device in the power supply system shown in FIG. 1 is a virtual synchronous generator model control type control device.

FIG. 6 is a block diagram showing a configuration of a frequency target value calculation unit in the control device shown in FIG. 5.

FIG. 7 is a block diagram showing a configuration of an active power correction value calculation unit in the control device shown in FIG. 5.

FIG. 8 is a block diagram showing a configuration of an internal phase difference angle calculation unit in the control device shown in FIG. 5.

FIG. 9 is a block diagram showing a configuration of an EMF target value calculation unit in the control device shown in FIG. 5.

FIG. 10 is a block diagram showing a configuration of a current target value calculation unit in the control device shown in FIG. 5.

FIG. 11 is a graph showing simulation results of active power change when equal loads are connected to two alternating-current wiring units.

FIG. 12 is a graph showing simulation results of changes in frequency and direct-current voltage when equal loads are connected to two alternating-current wiring units.

FIG. 13 is a graph showing simulation results of active power changes when a 60 kW load is connected to one alternating-current wiring unit and a 30 kW load is connected to the other alternating-current wiring unit.

FIG. 14 is a graph showing simulation results of changes in frequency and direct-current voltage when a 60 kW load is connected to one alternating-current wiring unit and a 30 kW load is connected to the other alternating-current wiring unit.

FIG. 15 is a graph showing simulation results of active power changes when one generator is disconnected from the alternating-current wiring unit in the steady state of FIG. 13.

FIG. 16 is a graph showing simulation results of changes in frequency and direct-current voltage when one generator is disconnected from the alternating-current wiring unit in the steady state of FIG. 14.

FIG. 17 is a block diagram showing a schematic configuration of a power supply system according to Embodiment 2 of the present invention.

FIG. 18 is a block diagram showing a configuration example of a command value correction unit shown in FIG. 17.

FIG. 19 is a block diagram explaining one application example of the power supply system of Embodiment 1 to an aircraft.

FIG. 20 is a block diagram explaining one application example of the power supply system of Embodiment 1 to an aircraft.

FIG. 21 is a block diagram explaining one application example of the power supply system of Embodiment 1 to a hybrid propulsion vessel.

DESCRIPTION OF EMBODIMENTS

Hereinafter, embodiments of the present invention will be described with reference to the drawings. In the following, elements that are identical or that have the same function are denoted by the same reference numerals throughout all the drawings, and the overlapping description will be omitted.

Embodiment 1

System Configuration

Hereinafter, Embodiment 1 of the present invention will be described. FIG. 1 is a block diagram showing a schematic configuration of a power supply system according to Embodiment 1 of the present invention. A power supply system 1 according to the present embodiment includes a plurality of (two in the example of FIG. 1) generators $2i$ (i=1,2). The power supply system 1 includes a plurality of alternating-current wiring units (alternating-current BUS) $3i$ respectively connected to the plurality of generators $2i$. That is, one generator $2i$ is connected to one alternating-current wiring unit $3i$, and supplies alternating-current power to a load 5 connected to the alternating-current wiring unit $3i$.

In the present embodiment, each of the generators $2i$ is configured such that the relationship of the frequency with respect to the power output from the generator $2i$ to the corresponding alternating-current wiring unit $3i$ has a predetermined first drooping characteristic. That is, each of the generators $2i$ has a characteristic of increasing the power (generator active power) to be output as the frequency (system frequency) in the corresponding alternating-current wiring unit $3i$ decreases. For example, in the case where the generator $2i$ is a motor generator, when the power consumption of the load 5 increases and the frequency in the alternating-current wiring unit $3i$ to which the load 5 is connected decreases, the output power of the generator $2i$ increases and the frequency balances with a value in accordance with the drooping characteristics. The generator $2i$ is not particularly limited as long as it has such a drooping characteristic, and may be, for example, a motor generator or a fuel cell generator. In addition, the predetermined first drooping characteristic may also include the relationship of the voltage with respective to the generator reactive power output by each generator.

Furthermore, the power supply system 1 includes a plurality of power conversion devices $4i$ (with an alternating-current unit $4ia$) connected to the plurality of alternating-current wiring units $3i$, and a direct-current wiring unit (direct-current BUS) 6 connecting direct-current units $4id$ of the plurality of power conversion devices $4i$. Each of the power conversion devices $4i$ converts alternating-current power input through the alternating-current wiring unit $3i$ into direct-current power, and converts direct-current power input through a direct-current wiring unit 6 into alternating-current power.

For example, alternating-current power output from a generator 21 connected to a corresponding alternating-current wiring unit 31 is converted into direct-current power by a power conversion device 41 and converted again into alternating-current power by another power conversion device 42 connected to the direct-current wiring unit 6. The power conversion device 41 is capable of supplying the alternating-current power to another alternating-current wiring unit 32 and is capable of converting direct-current power supplied from the alternating-current wiring unit 32 via the power conversion device 42 into alternating-current power and supplying the alternating-current power to the corresponding alternating-current wiring unit 31. Similar power exchange is possible in the power conversion device 42.

Each of the power conversion devices 4i is configured by, for example, a three-phase inverter or the like that outputs a three-phase alternating-current voltage from a direct-current voltage and outputs a direct-current voltage from a three-phase alternating-current voltage. Each of the power conversion devices 4i receives a drive signal So such as a PWM signal determined based on a target value of a predetermined control element transmitted from a control device 17i described later, and when switching operation is performed based on the drive signal So, each of the power conversion devices 4i performs power conversion between alternating-current power and direct-current power.

In the present embodiment, although the configuration in which the direct-current units 4id of the plurality of power conversion devices 4i are connected via the direct-current BUS is illustrated, the direct-current units 4id of the plurality of power conversion devices 4i may be configured to be directly connected to each other (a directly connected part is configured as the direct-current wiring unit 6).

The power supply system 1 includes a plurality of control devices 17i that perform power conversion control between the corresponding alternating-current wiring unit 3i and the direct-current wiring unit 6 by transmitting the drive signal So to the plurality of power conversion devices 4i. In the present embodiment, the plurality of control devices 17i are provided corresponding to the number of the power conversion devices 4i. That is, one control device 17i controls one power conversion device 4i. Alternatively, one control device 17i may control a plurality of power conversion devices 4i.

The control device 17i determines a target value of a control element such that a relationship of a frequency fac with respect to a power conversion device active power Pac (hereinafter may be simply referred to as the active power Pac) output by each of the power conversion devices 4i has a predetermined second drooping characteristic. In addition, the control device 17i is configured to generate the drive signal So (for example, a PWM signal) for each of the power conversion devices 4i by correcting the target value of the control element in response to a direct-current voltage Vdc at the direct-current wiring unit 6.

The control device 17i can adopt the following three control modes of voltage control type, current control type, and virtual synchronous generator model control type as more specific control modes for performing the above control. Each one will be described in detail below.

Voltage Control Type

FIG. 2 is a block diagram showing a schematic configuration of a control system when the control device of the power conversion device in the power supply system shown in FIG. 1 is a voltage control type control device. In FIG. 2, only one control device 17i for one power conversion device 4i is shown. Similar control is performed in the control device 17i for the other power conversion devices 4i. The voltage control type control device 17i controls the power conversion device 4i using the frequency fac of the corresponding alternating-current wiring unit 3i as a control element. More specifically, the voltage control type control device 17i includes a frequency target value calculation unit 74 calculating a frequency target value fac_ref by a frequency target value calculation process including a calculation to obtain a frequency reference value Δfac_ref by multiplying a deviation of the active power Pac with respect to a predetermined active power command value Pac_cmd by a coefficient Dr_p indicating the second drooping characteristic. The control device 17i controls the corresponding power conversion device 4i with the frequency target value fac_ref as one of the target values of the control element.

The power supply system 1 includes an alternating-current voltage measurement device 8 that detects an alternating-current voltage of the alternating-current unit 4ia of the power conversion device 4i, an alternating-current current measurement device 9 that detects an alternating-current current of the alternating-current unit 4ia, and a direct-current voltage measurement device 10 that detects a direct-current voltage Vdc of the direct-current unit 4id of the power conversion device 4i. For example, a PT (Potential Transformer) is used as the alternating-current voltage measurement device 8, and a CT (Current Transformer) is used as the alternating-current current measurement device 9. In addition, a detection circuit based on, for example, DCVT (DC Voltage Transducer) or resistance division is used as the direct-current voltage measurement device 10. The alternating-current voltage measurement device 8 and the alternating-current current measurement device 9 detect an instantaneous value of each phase in the three-phase alternating-current wiring, and the alternating-current voltage Vac, the alternating-current current Iac, and the like are calculated from the respective instantaneous values in calculation units 71 and 72 described later.

In the present embodiment, the alternating-current voltage and alternating-current current of the alternating-current wiring unit 3i are detected indirectly by detecting the instantaneous value of each phase of the alternating-current voltage and alternating-current current in the wiring unit branched from the corresponding alternating-current wiring unit (alternating-current BUS) 3i, and the direct-current voltage Vdc of the direct-current wiring unit 6 is detected by detecting the direct-current voltage Vdc in the wiring unit branched from the direct-current wiring unit (direct-current BUS) 6. Alternatively, the alternating-current voltage measurement device 8 and/or the alternating-current current measurement device 9 may be directly connected to the corresponding alternating-current wiring unit 3i, or the direct-current voltage measurement device 10 may be directly connected to the direct-current wiring unit 6.

The value detected by each of the measurement devices 8, 9, and 10 is input to the control device 17i. The control device 17i includes each control block of a voltage/frequency/phase calculation unit 71, a current calculation unit 72, an active/reactive power calculation unit 73, a frequency target value calculation unit 74, an alternating-current voltage target value calculation unit 75, and a drive signal generation unit 76.

Voltage/Frequency/Phase Calculation Unit

The voltage/frequency/phase calculation unit 71 calculates the alternating-current voltage Vac from instantaneous voltages $v_a$, $v_b$, and $v_c$ of each phase detected by the alternating-current voltage measurement device 8 using the following expression.

$$Vac = \sqrt{v_a^2 + v_b^2 + v_c^2} \qquad (1)$$

The voltage/frequency/phase calculation unit 71 calculates the frequency fac and a phase $\varphi_{ac}$ of the corresponding alternating-current wiring unit 3i by a well-known PLL (Phase Lock Loop) calculation. Furthermore, the voltage/frequency/phase calculation unit 71 calculates voltages (d-axis voltage Vd, and q-axis voltage Vq) in each coordinate axis of the rotational coordinate (dq coordinate) system of the alternating-current voltage using the following expression from the instantaneous voltages $v_a$, $v_b$, and $v_c$ and the phase $\varphi_{ac}$ of each phase.

Expression 2

$$\begin{bmatrix} Vd \\ Vq \end{bmatrix} = \sqrt{\frac{2}{3}} \begin{bmatrix} \cos\phi_{ac} & \cos\left(\phi_{ac} - \frac{2}{3}\pi\right) & \cos\left(\phi_{ac} - \frac{4}{3}\pi\right) \\ -\sin\phi_{ac} & -\sin\left(\phi_{ac} - \frac{2}{3}\pi\right) & -\sin\left(\phi_{ac} - \frac{4}{3}\pi\right) \end{bmatrix} \begin{bmatrix} v_a \\ v_b \\ v_c \end{bmatrix} \qquad (2)$$

Current Calculation Unit

The current calculation unit 72 calculates the current (d-axis current Id, and q-axis current Iq) in each coordinate axis of the rotation coordinate system of the alternating-current current from instantaneous current $i_a$, $i_b$, and $i_c$ of each phase and the phase $\varphi ac$ calculated by the voltage/frequency/phase calculation unit 71.

Expression 3

$$\begin{bmatrix} Id \\ Iq \end{bmatrix} = \sqrt{\frac{2}{3}} \begin{bmatrix} \cos\phi_{ac} & \cos\left(\phi_{ac} - \frac{2}{3}\pi\right) & \cos\left(\phi_{ac} - \frac{4}{3}\pi\right) \\ -\sin\phi_{ac} & -\sin\left(\phi_{ac} - \frac{2}{3}\pi\right) & -\sin\left(\phi_{ac} - \frac{4}{3}\pi\right) \end{bmatrix} \begin{bmatrix} i_a \\ i_b \\ i_c \end{bmatrix} \qquad (3)$$

Active/Reactive Power Calculation Unit

The active/reactive power calculation unit 73 calculates the corresponding power conversion device active power Pac and a power conversion device reactive power Qac (hereinafter, simply referred to as reactive power Qac in some cases) using the following expression from the voltages Vd and Vq calculated by the voltage/frequency/phase calculation unit 71 and the currents Id and Iq calculated by the current calculation unit 72.

$$Pac = Vd \cdot Id + Vq \cdot Iq$$

$$Qac = -(Vd \cdot Iq - Vq \cdot Id) \qquad \text{Expression 4}$$

In the present embodiment, as described above, it was shown an example in which an active/reactive power calculation unit that calculates the active power Pac and the reactive power Qac is configured by the control device 17i functioning as each control block of the alternating-current voltage measurement device 8, the alternating-current current measurement device 9, the voltage/frequency/phase calculation unit 71, the current calculation unit 72, and the active/reactive power calculation unit 73. Alternatively, the active/reactive power calculation unit may be configured by a known power meter or the like that inputs into the control device 17i the active power Pac and the reactive power Qac having been measured.

Frequency Target Value Calculation Unit

The frequency target value calculation unit 74 calculates the frequency target value fac_ref based on the active power Pac calculated by the active/reactive power calculation unit 73. Here, the frequency target value calculation unit 74 calculates the frequency target value fac_ref such that the relationship of the frequency fac with respect to the active power output from the power conversion device 4i to the corresponding alternating-current wiring unit 3i has a predetermined second drooping characteristic.

Specifically, the frequency target value calculation unit 74 calculates the frequency reference value Δfac_ref by multiplying the deviation of the active power Pac with respect to the predetermined active power command value Pac_cmd by a droop coefficient Dr_p in response to the second drooping characteristic. The frequency target value calculation unit 74 calculates the frequency target value fac_ref based on the calculated frequency reference value Δfac_ref and a predetermined frequency command value fac_cmd.

At this time, the frequency target value calculation unit 74 corrects the frequency target value fac_ref in response to the direct-current voltage Vdc in the direct-current wiring unit 6. More specifically, the frequency target value calculation unit 74 calculates a frequency correction value fac_cmp by multiplying the deviation of the direct-current voltage Vdc with respect to a predetermined direct-current voltage command value Vdc_cmd by a predetermined correction coefficient (correction gain) (−Kdc). The frequency target value calculation unit 74 calculates the frequency target value fac_ref by adding the frequency reference value Δfac_ref and the frequency correction value fac_cmp to the frequency command value fac_cmd.

FIG. 3 is a graph showing a second drooping characteristic in the present embodiment. When the generator 2i is connected to the alternating-current wiring unit 3i, if the power consumption of the load 5 connected to the alternating-current wiring unit 3i increases, the frequency fac in the alternating-current wiring unit 3i decreases. For example, as shown in FIG. 3, the frequency fac drops from f1 to f2. For this reason, the leading phase of the alternating-current voltage in the alternating-current wiring unit 3i increases with respect to the alternating-current voltage output from the power conversion device 4i. In response to this, the control device 17i decreases the frequency target value fac_ref so as to offset the leading phase. As a result, the active power Pac output from the power conversion device 4i increases. For example, as shown in FIG. 3, the active power Pac increases from P1 to P2.

On the contrary, when the power consumption of the load 5 connected to the alternating-current wiring unit 3i decreases, the frequency fac in the alternating-current wiring unit 3i increases, and thus the lagging phase of the alternating-current voltage in the alternating-current wiring unit 3i increases with respect to the alternating-current voltage output from the power conversion device 4i. In response to this, the control device 17i increases the frequency target value fac_ref so as to offset the lagging phase. As a result, the active power Pac output from the power conversion device 4i decreases. For example, in FIG. 3, when the frequency fac increases from f2 to f1, the active power Pac decreases from P2 to P1.

Here, as a result of each of the power conversion devices 4i performing power conversion according to the voltage change in the alternating-current wiring units 3i of the plurality of power conversion devices 4i connected to the common direct-current wiring unit 6, the frequency target value fac_ref is corrected based on the deviation from the direct-current voltage command value Vdc_cmd when the direct-current voltage Vdc of the direct-current wiring unit 6 changes. For example, when the direct-current voltage Vdc of the direct-current wiring unit 6 decreases, the control device 17*i* controls such that the active power Pac decreases even if the frequency fac in the alternating-current wiring unit 3*i* is the same. In the graph of FIG. 3, the active power Pac is adjusted based on the corrected drooping characteristic represented schematically as a straight line Lc. The straight line Lc is obtained by reducing the frequency intercept of a straight line L indicating the second drooping characteristic before correction by the frequency correction value fac_cmp. As a result, the active power Pac at a frequency f2 is corrected from P2 to P2c. On the other hand, when the direct-current voltage Vdc of the direct-current wiring unit 6 increases, the control device 17*i* controls such that the active power Pac increases even if the frequency fac in the alternating-current wiring unit 3*i* is the same.

Drive Signal Generation Unit

The voltage control type drive signal generation unit 76 receives the frequency fac of the alternating-current wiring unit 3*i* and the frequency target value fac_ref calculated by the frequency target value calculation unit 74. Based on these values having been input, the drive signal generation unit 76 generates the drive signal So such that the frequency fac of the alternating-current wiring unit 3*i* becomes the frequency target value fac_ref and the drive signal generation unit 76 outputs the drive signal So to the power conversion device 4*i*.

According to the above configuration, the generator 2*i* has the first drooping characteristic, and the target value fac_ref of the frequency fac that is the control element for alternating-current/direct-current conversion in the power conversion device 4*i* is determined such that the relationship of the frequency fac with respect to the active power Pac output by each of the power conversion devices 4*i* to the corresponding alternating-current wiring unit 3*i* has the second drooping characteristic. As a result, it is possible to exchange power among the plurality of wiring units 3*i* in response to the change in the active power Pac in the alternating-current wiring unit 3*i* associated with the load change. Furthermore, the frequency target value fac_ref is corrected in response to the direct-current voltage Vdc in the direct-current wiring unit 6. As a result, it is possible to suppress an excessive decrease or increase of the direct-current voltage Vdc, and to balance the exchange of power among the plurality of power conversion devices 4*i* connected by the common direct-current wiring unit 6.

In this manner, when each of the plurality of power conversion devices 4*i* executes the same control mode while taking into consideration direct-current voltage Vdc in the direct-current wiring unit 6, the power output at each alternating-current wiring unit 3*i* is controlled. Accordingly, it is possible to continue power supply to each wiring unit 3*i* when abnormality occurs in one generator 2*i* while executing the same control mode regardless of the presence or absence of abnormality of the generator 2*i* or the wiring unit 3*i*. It is also possible not to affect other wiring units 3*i* when abnormality occurs in part of the wiring unit 3*i*.

As a result, in the power supply system 1 according to the present embodiment, even when one generator 2*i* is stopped for some reason such as a failure, the power feed to the load 5 connected to the corresponding alternating-current wiring unit 3*i* can be prevented from being interrupted momentarily. Furthermore, even if a wiring abnormality such as a short circuit or a ground fault occurs in one alternating-current wiring unit 3*i*, it is possible to prevent the influence from spreading to the other alternating-current wiring units 3*i*.

The frequency command value fac_cmd, the active power command value Pac_cmd, and the direct-current voltage command value Vdc_cmd may be values set inside the control device 17*i* or may be input from the outside. Each command value may be a fixed value, or may be a value that changes based on the frequency fac of each of the alternating-current wiring units 3*i* as described later.

Alternating-Current Voltage Target Value Calculation Unit

In the present embodiment, the control device 17*i* is configured to determine the target value Vac_ref of the alternating-current voltage Vac that is the control element such that the relationship of the alternating-current voltage Vac with respect to the power conversion device reactive power Qac corresponding to each of the power conversion devices 4*i* has the predetermined third drooping characteristic.

The alternating-current voltage target value calculation unit 75 calculates the alternating-current voltage target value Vac_ref based on the reactive power Qac calculated by the active/reactive power calculation unit 73. Here, the alternating-current voltage target value calculation unit 75 calculates the alternating-current voltage target value Vac_ref such that the relationship of the alternating-current voltage Vac with respect to the reactive power Qac has the predetermined third drooping characteristic.

Specifically, the alternating-current voltage target value calculation unit 75 calculates an alternating-current voltage reference value ΔVac_ref by multiplying the deviation of the reactive power Qac with respect to a predetermined reactive power command value Qac_cmd by the droop coefficient Dr_q in accordance with the third drooping characteristic. The alternating-current voltage target value calculation unit 75 calculates the alternating-current voltage target value Vac_ref by adding the calculated alternating-current voltage reference value ΔVac_ref to the predetermined alternating-current voltage command value Vac_cmd.

The voltage control type drive signal generation unit 76 generates the drive signal So such that the alternating-current voltage Vac of the alternating-current wiring unit 3*i* becomes the alternating-current voltage target value Vac_ref, and outputs the drive signal So to the power conversion device 4*i*.

According to this, not only the relationship between the active power Pac and the frequency fac but also the relationship between the reactive power Qac and the alternating-current voltage Vac is controlled using the drooping characteristic. When the generator 2*i* is connected to the alternating-current wiring unit 3*i*, if the reactive power of the load 5 connected to the alternating-current wiring unit 3*i* increases, the alternating-current voltage Vac in the alternating-current wiring unit 3*i* decreases. This increases the voltage difference between the alternating-current voltage Vac in the alternating-current wiring unit 3*i* and the alternating-current voltage output to the alternating-current unit 4*ia* of the power conversion device 4*i*. In response to this, the control device 17*i* decreases the alternating-current voltage target value Vac_ref so as to offset the voltage difference. As a result, the reactive power Qac output from the power conversion device 4*i* increases.

On the other hand, if the reactive power of the load 5 connected to the alternating-current wiring unit 3*i* decreases, the alternating-current voltage Vac in the alternating-current wiring unit 3*i* increases. This increases the voltage difference between the alternating-current voltage Vac in the alternating-current wiring unit 3$i$ and the alternating-current voltage output to the alternating-current unit 4$ia$ of the power conversion device 4$i$. In response to this, the control device 17$i$ increases the alternating-current voltage target value Vac_ref so as to offset the voltage difference. As a result, the reactive power Qac output from the power conversion device 4$i$ decreases. Accordingly, it is possible to exchange power among the plurality of wiring units 3$i$ in response to the change in reactive power Qac associated with the load change.

The second drooping characteristic and the third drooping characteristic may be set to have the same characteristic as the first drooping characteristic (the same slope in the graph of FIG. 3), or may be set as different characteristics.

While in the present embodiment, the alternating-current voltage target value Vac_ref is also calculated using the third drooping characteristic, the alternating-current voltage target value Vac_ref may be a fixed target value without performing such calculation.

Furthermore, the alternating-current voltage command value Vac_cmd and reactive power command value Qac_cmd may be values set inside the control device 17$i$ or may be input from the outside. Each command value may be a fixed value, or may be a value that changes based on the frequency fac of each of the alternating-current wiring units 3$i$ as described later.

Current Control Type

FIG. 4 is a block diagram showing a schematic configuration of a control system when the control device of the power conversion device in the power supply system shown in FIG. 1 is a current control type control device. In FIG. 4, only one control device 17$i$ for one power conversion device 4$i$ is shown. Similar control is performed in the control device 17$i$ for the other power conversion devices 4$i$. The current control type control device 17$i$ controls the power conversion device 4$i$ using the alternating-current currents Id and Iq of the corresponding alternating-current wiring unit 3$i$ as a control element. More specifically, the current control type control device 17$i$ includes an active power target value calculation unit 77 that calculates an active power target value Pac_ref by an active power target value calculation process of obtaining an active power reference value ΔPac_ref by multiplying a deviation of the frequency fac with respect to the predetermined frequency command value fac_cmd by a coefficient 1/Dr_p indicating the second drooping characteristic. The control device 17$i$ controls the corresponding power conversion device 4$i$ with the active power target value Pac_ref as one of the target values of the control element.

As in the case of the voltage control type, the current control type power supply system 1 also includes the alternating-current voltage measurement device 8, the alternating-current current measurement device 9, and the direct-current voltage measurement device 10. The value detected by each of the measurement devices 8, 9, and 10 is input to the control device 17$i$. The control device 17$i$ includes each control block of a voltage/frequency/phase calculation unit 71, a current calculation unit 72, an active/reactive power calculation unit 73, the active power target value calculation unit 77, a reactive power target value calculation unit 78, and a drive signal generation unit 79. The configurations of the voltage/frequency/phase calculation unit 71, the current calculation unit 72, and the active/reactive power calculation unit 73 are the same as those of the voltage control type, and thus the description thereof is omitted.

Active Power Target Value Calculation Unit

The active power target value calculation unit 77 calculates the active power target value Pac_ref based on the frequency fac calculated by the voltage/frequency/phase calculation unit 71. Here, the active power target value calculation unit 77 calculates the frequency target value Pac_ref such that the relationship of the frequency fac with respect to the active power Pac output from the power conversion device 4$i$ to the corresponding alternating-current wiring unit 3$i$ has a predetermined second drooping characteristic.

Specifically, the active power target value calculation unit 77 calculates the active power reference value ΔPac_ref by multiplying a deviation of the frequency fac with respect to the predetermined frequency command value fac_cmd by a droop coefficient 1/Dr_p in response to the second drooping characteristic. The active power target value calculation unit 77 calculates the active power target value Pac_ref based on the calculated active power reference value ΔPac_ref and the predetermined active power command value Pac_cmd.

At this time, the active power target value calculation unit 77 corrects the active power target value Pac_ref in response to the direct-current voltage Vdc in the direct-current wiring unit 6. More specifically, the active power target value calculation unit 77 calculates an active power correction value Pac_cmp by multiplying the deviation of the direct-current voltage Vdc with respect to a predetermined direct-current voltage command value Vdc_cmd by a predetermined correction coefficient (correction gain) (–Kdc). The active power target value calculation unit 77 calculates the active power target value Pac_ref by adding the active power reference value ΔPac_ref and the active power correction value Pac_cmp to the active power command value Pac_cmd.

Reactive Power Target Value Calculation Unit

In the present embodiment, the control device 17$i$ is configured to determine a target value Qac_ref of the reactive power Qac that is the control element such that the relationship of the power conversion device reactive power Qac with respect to the alternating-current voltage Vac corresponding to each of the power conversion devices 4$i$ has the predetermined third drooping characteristic.

The reactive power target value calculation unit 78 calculates the reactive power target value Qac_ref based on the alternating-current voltage Vac calculated by the voltage/frequency/phase calculation unit 71. Here, the reactive power target value calculation unit 78 calculates the reactive power target value Qac_ref such that the relationship of the alternating-current voltage Vac with respect to the reactive power Qac output from the power conversion device 4$i$ to the corresponding alternating-current wiring unit 3$i$ has the predetermined third drooping characteristic.

Specifically, the reactive power target value calculation unit 78 calculates the reactive power reference value ΔQac_ref by multiplying a deviation of the alternating-current voltage Vac with respect to the predetermined alternating-current voltage command value Vac_cmd by a droop coefficient 1/Dr_q in response to the third drooping characteristic. The reactive power target value calculation unit 78 calculates the reactive power target value Qac_ref by adding the calculated reactive power reference value ΔQac_ref to the predetermined reactive power command value Qac_cmd.

Drive Signal Generation Unit

The current control type drive signal generation unit 79 receives the alternating-current currents Id and Iq, the phase φpac, the active power target value Pac_ref, and the reactive power target value Qac_ref of the alternating-current wiring unit 3$i$. The drive signal generation unit 79 calculates alternating-current current target values Id_ref and Iq_ref from the active power target value Pac_ref and the reactive power target value Qac_ref using the following expression.

Expression 5

$$\text{Id\_ref} = \frac{\text{Pac\_ref}}{Vac} \qquad (5)$$
$$\text{Iq\_ref} = \frac{\text{Qac\_ref}}{Vac}$$

When the alternating-current current target values Id_ref and Iq_ref are calculated from the active power target value Pac_ref and the reactive power target value Qac_ref, the expression (4) may be used instead of the above expression.

Furthermore, the drive signal generation unit 79 obtains the drive signal So such that the alternating-current currents Id and Iq of the alternating-current wiring unit 3$i$ become the alternating-current current target values Id_ref and Iq_ref, and outputs the drive signal So to the power conversion device 4$i$. Specifically, the drive signal generation unit 79 calculates alternating-current voltage target values Vd_ref and Vq_ref from the alternating-current current target values Id_ref and Iq_ref using the following expression. Here, Kd and Kq represent predetermined gains, and T_id and T_iq represent predetermined time constants.

Expression 6

$$\text{Vd\_ref} = Kd\left(1 + \frac{1}{\text{T\_id} * s}\right)(\text{Id\_ref} - Id) \qquad (6)$$
$$\text{Vq\_ref} = Kq\left(1 + \frac{1}{\text{T\_iq} * s}\right)(\text{Iq\_ref} - Iq)$$

The drive signal generation unit 79 calculates target values Va_ref, Vb_ref, and Vc_ref of the instantaneous voltages Va, Vb, and Vc of the alternating-current wiring units 3$i$ that are of three-phase alternating-current from the alternating-current voltage target values Vd_ref and Vq_ref using the following expression.

Expression 7

$$\begin{bmatrix} V_{a\_ref} \\ V_{b\_ref} \\ V_{c\_ref} \end{bmatrix} = \sqrt{\frac{2}{3}} \begin{bmatrix} \cos\phi_{ac} & -\sin\phi_{ac} \\ \cos\left(\phi_{ac} - \frac{2}{3}\pi\right) & -\sin\left(\phi_{ac} - \frac{2}{3}\pi\right) \\ \cos\left(\phi_{ac} - \frac{4}{3}\pi\right) & -\sin\left(\phi_{ac} - \frac{4}{3}\pi\right) \end{bmatrix} \begin{bmatrix} \text{Vd\_ref} \\ \text{Vq\_ref} \end{bmatrix} \qquad (7)$$

The current control type control mode also brings the same control result as that of the voltage control type control mode. When the generator 2$i$ is connected to the alternating-current wiring unit 3$i$, if the power consumption of the load 5 connected to the alternating-current wiring unit 3$i$ increases, the load sharing of the generator 2$i$ increases, and the rotational speed wac of the generator 2$i$ and hence the frequency fac decrease due to the first drooping characteristic of the generator 2$i$. For this reason, the leading phase of the alternating-current voltage in the alternating-current wiring unit 3$i$ increases with respect to the alternating-current voltage output from the power conversion device 4$i$.

In response to this, the control device 17$i$ increases the active power target value Pac_ref so as to offset the leading phase. As a result, the active power Pac output from the power conversion device 4$i$ increases.

On the contrary, if the power consumption of the load 5 connected to the alternating-current wiring unit 3$i$ decreases, the load sharing of the generator 2$i$ decreases, and the rotation speed wac of the generator 2$i$ and hence the frequency fac increase due to the first drooping characteristic of the generator 2$i$. For this reason, the lagging phase of the alternating-current voltage in the alternating-current wiring unit 3$i$ increases with respect to the alternating-current voltage output from the power conversion device 4$i$. In response to this, the control device 17$i$ decreases the active power target value Pac_ref so as to offset the lagging phase. As a result, the active power Pac output from the power conversion device 4$i$ decreases.

Here, as a result of each of the power conversion devices 4$i$ performing power conversion according to the voltage change in the alternating-current wiring units 3$i$ of the plurality of power conversion devices 4$i$ connected to the common direct-current wiring unit 6, the active power target value Pac_ref is corrected based on the deviation from the direct-current voltage command value Vdc_cmd when the direct-current voltage Vdc of the direct-current wiring unit 6 changes. For example, when the direct-current voltage Vdc of the direct-current wiring unit 6 decreases, the control device 17$i$ controls such that the active power Pac decreases even if the frequency fac in the alternating-current wiring unit 3$i$ is the same. On the other hand, when the direct-current voltage Vdc of the direct-current wiring unit 6 increases, the control device 17$i$ controls such that the active power Pac increases even if the frequency fac in the alternating-current wiring unit 3$i$ is the same.

According to the above configuration, the generator 2$i$ has the first drooping characteristic, and the target value Pac_ref of the active power Pac that is the control element for alternating-current/direct-current conversion in the power conversion device 4$i$ is determined such that the relationship of the frequency fac with respect to the active power Pac in the alternating-current wiring unit 3$i$ has the second drooping characteristic. As a result, it is possible to exchange power among the plurality of wiring units 3$i$ in response to the change in the active power Pac associated with the load change. Furthermore, the active power target value Pac_ref is corrected in response to the direct-current voltage Vdc in the direct-current wiring unit 6. As a result, it is possible to suppress an excessive decrease or increase of the direct-current voltage Vdc, and to balance the exchange of power among the plurality of power conversion devices 4$i$ connected by the common direct-current wiring unit 6.

In this manner, when each of the plurality of power conversion devices 4$i$ executes the same control mode while taking into consideration direct-current voltage Vdc in the direct-current wiring unit 6, the power output at each alternating-current wiring unit 3$i$ is controlled. Accordingly, also in the current control type control mode, it is possible to continue power supply to each wiring unit 3$i$ when abnormality occurs in one generator 2$i$ while executing the same control mode regardless of the presence or absence of abnormality of the generator 2$i$ or the wiring unit 3$i$. It is possible not to affect other wiring units 3$i$ when abnormality occurs in part of the wiring unit 3$i$.

As a result, in the power supply system 1 according to the present embodiment, even when one generator 2$i$ is stopped for some reason such as a failure, the power feed to the load 5 connected to the corresponding alternating-current wiring unit 3i can be prevented from being interrupted momentarily. Furthermore, even if a wiring abnormality such as a short circuit or a ground fault occurs in one alternating-current wiring unit 3i, it is possible to prevent the influence from spreading to the other alternating-current wiring units 3i.

Furthermore, not only the relationship between the active power Pac and the frequency fac but also the relationship between the reactive power Qac and the alternating-current voltage Vac is controlled using the drooping characteristic. If the power consumption of the load 5 connected to the alternating-current wiring unit 3i increases, the reactive power sharing of the generator 2i increases, and the alternating-current voltage Vac output by the generator 2i decreases due to the first drooping characteristic of the generator 2i. This increases the voltage difference between the alternating-current voltage in the alternating-current wiring unit 3i and the alternating-current voltage output to the alternating-current unit 4ia of the power conversion device 4i. In response to this, the control device 17i increases the reactive power target value Qac_ref so as to offset the voltage difference. As a result, the reactive power Qac output from the power conversion device 4i increases.

On the contrary, if the power consumption of the load 5 connected to the alternating-current wiring unit 3i decreases, the reactive power sharing of the generator 2i decreases, and the alternating-current voltage Vac output by the generator 2i increases due to the first drooping characteristic of the generator 2i. This increases the voltage difference between the alternating-current voltage in the alternating-current wiring unit 3i and the alternating-current voltage output to the alternating-current unit 4ia of the power conversion device 4i. In response to this, the control device 17i decreases the reactive power target value Qac_ref so as to offset the voltage difference. As a result, the reactive power Qac output from the power conversion device 4i decreases. Accordingly, it is possible to exchange power among the plurality of wiring units 3i in response to the change in the alternating-current voltage Vac associated with the change in the reactive power Qac.

Also in the current control type control mode, the second drooping characteristic and the third drooping characteristic may be set to have the same characteristic as the first drooping characteristic, or may be set as different characteristics.

While in the present embodiment, the reactive power target value Qac_ref is also calculated using the third drooping characteristic, the reactive power target value Qac_ref may be a fixed target value without performing such calculation.

The frequency command value fac_cmd, the active power command value Pac_cmd, the direct-current voltage command value Vdc_cmd, the alternating-current voltage command value Vac_cmd, and reactive power command value Qac_cmd may be values set inside the control device 17i or may be input from the outside. Each command value may be a fixed value, or may be a value that changes based on the frequency fac of each of the alternating-current wiring units 3i as described later.

Virtual Synchronous Generator Model Control Type

FIG. 5 is a block diagram showing a schematic configuration of a control system when the control device of the power conversion device in the power supply system shown in FIG. 1 is a virtual synchronous generator model control type control device. In FIG. 5, only one control device 17i for one power conversion device 4i is shown. Similar control is performed in the control device 17i for the other power conversion devices 4i. The virtual synchronous generator model control type control device 17i controls the power conversion device 4i using the alternating-current currents Id and Iq of the corresponding alternating-current wiring unit 3i as a control element.

More specifically, the virtual synchronous generator model control type control device 17i has a frequency target value calculation unit 80 that calculates the frequency target value fac_ref by the frequency target value calculation process including the calculation of multiplying a value based on a deviation of the active power Pac with respect to the predetermined active power command value Pac_cmd by the coefficient Dr_p indicating the second drooping characteristic. The control device 17i controls the corresponding power conversion device 4i with the current target values Id_ref and Iq_ref calculated based on the frequency target value fac_ref as the target values of the control elements. At this time, the control device 17i performs virtual synchronous generator model control for controlling the power output to the alternating-current unit 4ia of the power conversion device 4i on the assumption that a virtual synchronous generator is connected to the alternating-current wiring unit 3i.

As in the case of the voltage control type, the virtual synchronous generator model control type power supply system 1 also includes the alternating-current voltage measurement device 8, the alternating-current current measurement device 9, and the direct-current voltage measurement device 10. The value detected by each of the measurement devices 8, 9, and 10 is input to the control device 17i. The control device 17i includes each control block of a voltage/frequency/phase calculation unit 71, a current calculation unit 72, an active/reactive power calculation unit 73, the frequency target value calculation unit 80, an active power correction value calculation unit 81, an internal phase difference angle calculation unit 82, an electromotive force induced by the field windings (EMF) target value calculation unit 83, a current target value calculation unit 84, a drive signal generation unit 85. The configurations of the voltage/frequency/phase calculation unit 71, the current calculation unit 72, and the active/reactive power calculation unit 73 are the same as those of the voltage control type, and thus the description thereof is omitted.

Frequency Target Value Calculation Unit

FIG. 6 is a block diagram showing a configuration of a frequency target value calculation unit in the control device shown in FIG. 5. As shown in FIG. 6, the frequency target value calculation unit 80 calculates a value obtained by multiplying a value obtained by adding the active power correction value Pac_cmp described later to the deviation of the active power Pac with respect to the predetermined active power command value Pac_cmd by the droop coefficient Dr_p in response to the second drooping characteristic. In the present embodiment, the frequency target value calculation unit 80 inputs the calculated value to a first-order lagging calculation unit 86 to perform a first-order lagging calculation. Due to this, the moment of inertia generated in the actual generator is simulated in the virtual synchronous generator model. Alternatively, the moment of inertia generated in the generator by a calculation process other than the first-order lagging calculation may be simulated.

Furthermore, the value output from the first-order lagging calculation unit 86 is input to an upper/lower limiter 87. The upper/lower limiter 87 limits the value output from the first-order lagging calculation unit 86 between a predetermined upper limit value and a predetermined lower limit value, and outputs the frequency reference value Δfac_ref. Note that the frequency reference value Δfac_ref may be calculated without providing the first-order lagging calculation unit 86 and/or the upper/lower limiter 87 in the frequency target value calculation unit 80.

The frequency target value calculation unit 80 calculates the frequency target value fac_ref by adding the predetermined frequency command value fac_cmd to the frequency reference value Δfac_ref output from the upper/lower limiter 87.

Active Power Correction Value Calculation Unit

FIG. 7 is a block diagram showing a configuration of an active power correction value calculation unit in the control device shown in FIG. 5. As shown in FIG. 7, the active power correction value calculation unit 81 calculates an active power correction value Pac_cmp by multiplying the deviation of the direct-current voltage Vdc with respect to a predetermined direct-current voltage command value Vdc_cmd by a predetermined correction coefficient (correction gain) (−Kdc).

When the direct-current voltage Vdc is smaller than the direct-current voltage command value Vdc_cmd, the calculated active power correction value Pac_cmp is negative. Therefore, in the frequency target value calculation unit 80, correction is made in the direction where the active power Pac output from the power conversion device 4$i$ decreases. Conversely, when the direct-current voltage Vdc is larger than the direct-current voltage command value Vdc_cmd, the calculated active power correction value Pac_cmp is positive. Therefore, in the frequency target value calculation unit 80, correction is made in the direction where the active power Pac output from the power conversion device 4$i$ increases.

Internal Phase Difference Angle Calculation Unit

FIG. 8 is a block diagram showing a configuration of an internal phase difference angle calculation unit in the control device shown in FIG. 5. As shown in FIG. 8, the internal phase difference angle calculation unit 82 calculates a deviation of the frequency fac of the alternating-current wiring unit 3$i$ with respect to the frequency target value fac_ref calculated by the frequency target value calculation unit 80, and inputs the deviation to an integrator 88. The integrator 88 calculates an internal phase difference angle θ in the virtual synchronous generator by integrating the rotational speed of the virtual synchronous generator obtained by multiplying the deviation by a unit conversion coefficient Kw.

EMF Target Value Calculation Unit

FIG. 9 is a block diagram showing a configuration of an EMF target value calculation unit in the control device shown in FIG. 5. As shown in FIG. 9, the EMF target value calculation unit 83 calculates the alternating-current voltage target value Vac_ref based on the reactive power Qac calculated by the active/reactive power calculation unit 73. Here, the EMF target value calculation unit 83 calculates the alternating-current voltage target value Vac_ref such that the relationship of the alternating-current voltage Vac with respect to the reactive power Qac has the predetermined third drooping characteristic.

Specifically, the EMF target value calculation unit 83 calculates the alternating-current voltage reference value ΔVac_ref based on a value obtained by multiplying the deviation of the reactive power Qac with respect to the predetermined reactive power command value Qac_cmd by the droop coefficient Dr_q in accordance with the third drooping characteristic. In the present embodiment, similarly to the frequency target value calculation unit 80, the EMF target value calculation unit 83 includes a first-order lagging calculation unit 89 and an upper/lower limiter 90.

Note that the alternating-current voltage reference value ΔVac_ref may be calculated without providing the first-order lagging calculation unit 89 and/or the upper/lower limiter 90 in the EMF target value calculation unit 83.

The EMF target value calculation unit 83 calculates the alternating-current voltage target value Vac_ref by adding the calculated alternating-current voltage reference value ΔVac_ref to the predetermined alternating-current voltage command value Vac_cmd. The alternating-current voltage target value Vac_ref is input to a first function calculation unit 91. The first function calculation unit 91 performs the calculation shown in the following expression, and outputs an EMF target value Ef_ref.

Expression 8

$$Efd = \text{Vac\_ref} + rId - xIq \quad (8)$$
$$Efq = rIq + xId$$
$$\text{Ef\_ref} = \sqrt{E^2fd + E^2fq}$$

The EMF target value Ef calculated by the above expression is obtained by subtracting a voltage drop due to an overall impedance (r, x), which is the sum of the internal impedance of the direct-current wiring unit 6 and the external impedance between the direct-current wiring unit 6 and the alternating-current wiring unit 3$i$, from the alternating-current voltage target value Vac_ref. The internal impedance can be determined, for example, by Thevenin's theorem. The internal impedance in an actual motor generator is generally said to be a very small value (almost zero). The external impedance consists of a reactor and a wiring resistance provided between the power conversion device 4$i$ and the alternating-current wiring unit 3$i$. Since the alternating-current current Iac flowing through the alternating-current wiring unit 3$i$ is measured, the EMF target value Ef can be calculated by back calculation from the alternating-current voltage Vac of the alternating-current wiring unit 3$i$ if the overall impedance is determined.

Current Target Value Calculation Unit

FIG. 10 is a block diagram showing a configuration of a current target value calculation unit in the control device shown in FIG. 5. As shown in FIG. 10, the current target value calculation unit 84 inputs, to a second function calculation unit 92, the internal phase difference angle θ calculated by the internal phase difference angle calculation unit 82, the EMF target value Ef_ref calculated by the EMF target value calculation unit 83, and the alternating-current voltages Vd and Vq calculated by the voltage/frequency/phase calculation unit 71. The second function calculation unit 92 performs the calculation shown in the following expression, and outputs the alternating-current current target values Id_ref and Iq_ref.

Expression 9

$$\Delta Vd + j\Delta Vq = (Ef\cos\theta - Vd) + j(Ef\sin\theta - Vq) \quad (9)$$
$$\text{Id\_ref} = \frac{1}{r^2 + x^2}(r\Delta Vd + x\Delta Vq)$$
$$\text{Iq\_ref} = \frac{1}{r^2 + x^2}(r\Delta Vq - x\Delta Vd)$$

The alternating-current current target values Id_ref and Iq_ref calculated by the above expression is a current value flowing through the overall impedance on the assumption that the overall impedance is connected between the power supply that is the alternating-current voltage Vac of the alternating-current wiring unit $3i$ and the power supply that is the EMF target value Ef_ref.

The internal impedances $r_a$ and $x_s$ in the actual direct-current wiring unit 6 are almost equal to zero, and the overall impedances $r=r_a+r_l$ and $x=x_s+x_l$ are almost equal to the external impedances $r_l$ and $x_l$ between the direct-current wiring unit 6 and the alternating-current wiring unit $3i$. However, as described above, in the present embodiment, when the EMF target value Ef_ref and the current target values Id_ref and Iq_ref are calculated, the overall impedance, which is the sum of the internal impedance of the direct-current wiring unit 6 and the external impedance between the direct-current wiring unit 6 and the alternating-current wiring unit $3i$, is used.

A stable operation is made possible by virtually increasing, in particular, the internal impedance of the direct-current wiring unit 6 to obtain the overall impedance, and, using this virtual impedance, calculating the EMF target value Ef_ref and the alternating-current current target values Id_ref and Iq_ref. It is because, when the plurality of power conversion devices $4i$ are operated in parallel, a slight voltage difference between the power conversion devices $4i$ causes a large loss of output balance due to lowness of the impedance of the power conversion device $4i$. Virtual increase of the internal impedance of the direct-current wiring unit 6 leads to the increase of the impedance of the power conversion device $4i$ and leads to the prevention of unstable output balance due to the voltage difference. For example, in the case where the internal impedance is practically zero, a considerable stabilization can be achieved by setting the resistance to 0.1 pu and the reactance to 0.4 pu in the overall impedance.

That is, the current target value calculation unit 84 estimates current value output to the alternating-current wiring unit $3i$ when the virtual power conversion device $4i$ generates an EMF calculated by the EMF target value calculation unit 83 and the internal phase difference angle calculation unit 82. This suppresses the system from becoming unstable at the time of a parallel operation of the plurality of power conversion devices $4i$ caused by an increase in the apparent impedance of the power conversion devices $4i$.

Drive Signal Generation Unit

The drive signal generation unit 85 of the virtual synchronous generator model control type receives the alternating-current currents Id and Iq of the alternating-current wiring unit $3i$, the phase $\varphi ac$, and the alternating-current current target values Id_ref and Iq_ref. The drive signal generation unit 85 generates the drive signal So such that the alternating-current currents Id and Iq of the alternating-current wiring unit $3i$ become the alternating-current current target values Id_ref and Iq_ref, and outputs the drive signal So to the power conversion device $4i$. Specifically, similarly to the current control type drive signal generation unit 79, the drive signal generation unit 85 calculates the alternating-current voltage target values Vd_ref and Vq_ref from the alternating-current current target values Id_ref and Iq_ref and calculates, from these values, the target values Va_ref, Vb_ref, and Vc_ref of the instantaneous voltages Va, Vb, and Vc of the alternating-current wiring unit $3i$.

Also in the control mode of the virtual synchronous generator model control type, the same control result as that of the control mode of the voltage control type is provided. That is, the frequency target value fac_ref is generated such that the frequency fac in the alternating-current wiring unit $3i$ changes in response to the change in the power consumption of the load 5 connected to the alternating-current wiring unit $3i$ based on the second drooping characteristic. Then, the frequency target value fac_ref is corrected in response to the change of the direct-current voltage Vdc of the direct-current wiring unit 6.

Accordingly, also in the control mode of the virtual synchronous generator model control type, it is possible to continue power supply to each wiring unit $3i$ when abnormality occurs in one generator $2i$ while executing the same control mode regardless of the presence or absence of abnormality of the generator $2i$ or the wiring unit $3i$, and it is possible not to affect other wiring units $3i$ when abnormality occurs in part of the wiring unit $3i$.

The control using the drooping characteristic is performed also for the relationship between the reactive power Qac output from the power conversion device $4i$ to the alternating-current wiring unit $3i$ and the alternating-current voltage Vac in addition to the relationship between the active power Pac output from the power conversion device $4i$ to the alternating-current wiring unit $3i$ and the frequency fac. Accordingly, it is possible to exchange power among the plurality of wiring units $3i$ in response to the change in the alternating-current voltage Vac associated with the change in the reactive power Qac.

Also in the virtual synchronous generator model control type control mode, the second drooping characteristic and the third drooping characteristic may be set to have the same characteristic as the first drooping characteristic, or may be set as different characteristics.

While in the present embodiment, the reactive power target value Qac_ref is also calculated using the third drooping characteristic, the reactive power target value Qac_ref may be a fixed target value without performing such calculation.

The frequency command value fac_cmd, the active power command value Pac_cmd, the direct-current voltage command value Vdc_cmd, the alternating-current voltage command value Vac_cmd, and reactive power command value Qac_cmd may be values set inside the control device $17i$ or may be input from the outside. Each command value may be a fixed value, or may be a value that changes based on the frequency fac of each of the alternating-current wiring units $3i$ as described later.

Simulation Result

The simulation result in the power supply system 1 of the embodiment is shown below. As shown in FIG. 1, this simulation is conducted using the power supply system 1, in which the generators 21 and 22 and the power conversion devices 41 and 42 are respectively connected to the alternating-current wiring units 31 and 32. The drooping characteristic (first drooping characteristic) of the frequency/voltage with respect to the active/reactive power in the generators 21 and 22 is set to 2%, the drooping characteristic (first and the second drooping characteristics) of the frequency/voltage with respect to the active/reactive power in the power conversion devices 41 and 42 is set to 1% (Dr_p=Dr_q=0.01), and the correction coefficient (−Kdc) for correction by the direct-current voltage Vdc is set to −0.3. The capacity of each of the power conversion devices 41 and 42 is 60 kW, and the rated voltage of the direct-current wiring unit 6 is set to 540 V.

FIGS. 11 to 16 are graphs showing the simulation results in the present embodiment. In each of the drawings, P11 denotes change of the generator active power that the generator 21 outputs, P12 denotes change of the power conversion device active power that the power conversion device 41 outputs to the alternating-current wiring unit 31, P21 denotes change of the generator active power that the generator 22 outputs, and P22 denotes change of the power conversion device active power that the power conversion device 42 outputs to the alternating-current wiring unit 32. Furthermore, f1 denotes change of the frequency of the alternating-current wiring unit 31, f2 denotes change of the frequency of the alternating-current wiring unit 32, and Vdc denotes change of the direct-current voltage of the direct-current wiring unit 6.

FIG. 11 is a graph showing active power change when equal loads are connected to two alternating-current wiring units, and FIG. 12 is a graph showing changes in frequency and direct-current voltage when equal loads are connected to two alternating-current wiring units. The simulation result that is shown is of the case of connecting a load of 45 kW to each of the alternating-current wiring units 31 and 32 in 3 seconds after the start of the simulation. FIGS. 11 and 12 show that the response of each value by the load connection converges to a constant value to enter a steady state. At this time, there is no power interchange occurring between the two alternating-current wiring units 31 and 32.

FIG. 13 is a graph showing active power changes when a 60 kW load is connected to one alternating-current wiring unit 31 and a 30 kW load is connected to the other alternating-current wiring unit 32. FIG. 14 is a graph showing changes in frequency and direct-current voltage when a 60 kW load is connected to one alternating-current wiring unit 31 and a 30 kW load is connected to the other alternating-current wiring unit 32. Also in the simulations of FIGS. 13 and 14, loads are connected in 3 seconds after the start of the simulation. FIGS. 13 and 14 indicate that, even when the load connected to the two alternating-current wiring units 31 and 32 is biased, the response of each value by the load connection converges to a constant value and enters a steady state. At this time, the increase of P12 and the decrease of P22 indicate that power interchange has occurred from the power conversion device 42 to the power conversion device 41.

FIG. 15 is a graph showing active power changes when one generator 21 is disconnected from the alternating-current wiring unit 31 in the steady state of FIG. 13, and FIG. 16 is a graph showing changes in frequency and direct-current voltage when one generator 21 is disconnected from the alternating-current wiring unit 31 in the steady state of FIG. 14. In FIGS. 15 and 16, the generator 21 is disconnected from the alternating-current wiring unit 31 in 10 seconds after the start of the simulation. At this time, while P11 becomes 0, P21 increases immediately after that, and accordingly P12 increases and P22 decreases.

This indicates that the power from the generator 22 is supplied to the load of the alternating-current wiring unit 31 through the power conversion device 42 and the power conversion device 41 immediately after the generator 21 is disconnected from the alternating-current wiring unit 31. Accordingly, it is indicated that, even if one generator 21 is stopped due to an abnormality such as a failure, the power supply system 1 of the present embodiment is capable of continuing power supply to the alternating-current wiring unit 31 and capable of properly exchanging power between the plurality of alternating-current wiring units 31 and 32. It is also indicated that after the generator 21 is disconnected, the response of each value converges to a constant value to enter the steady state. Accordingly, it is indicated that the power supply system 1 in the present embodiment is stable.

Embodiment 2

Next, Embodiment 2 of the present invention will be described. FIG. 17 is a block diagram showing a schematic configuration of a power supply system according to Embodiment 2 of the present invention. The same parts in Embodiment 2 as those in Embodiment 1 are given the same reference numerals, and a description thereof will be omitted. A power supply system 1B according to Embodiment 2 differs from the power supply system 1 according to Embodiment 1 in that the control device includes a command value correction unit 101 that corrects a command value of a control element that serves as a reference of a target value of the control element based on an average value of the frequencies $f_iac$ of the plurality of alternating-current wiring units $3i$ such that the outputs of the generators $2i$ become equal to each other.

In the present embodiment, similarly to the example of FIG. 1, the control devices $17i$ having the same number as the power conversion devices are individually connected to the plurality of power conversion devices $4i$. Then, the power supply system 1B includes another control device (higher-level control device) 100 that transmits a command value correction value to each of the control devices $17i$.

FIG. 18 is a block diagram showing a configuration example of a command value correction unit shown in FIG. 17. The example of FIG. 18 presents a configuration example of the command value correction unit 101 in a case where the control device $17i$ is a voltage control type (FIG. 2) or a virtual synchronous generator model control type (FIG. 5).

The frequency fac (denoted as $f_iac(i=1, 2, \ldots, n)$ in FIG. 18) of the plurality of alternating-current wiring units $3i$ is input to the command value correction unit 101. The plurality of frequencies $f_iac$ having been input are input to an average value calculation unit 102. The average value calculation unit 102 outputs an average value of the plurality of frequencies $f_iac$. For example, the average value calculation unit 102 calculates an average value fac_ave by dividing a sum of the plurality of frequencies $f_iac$ by the number (the sum) n of the alternating-current wiring units $3i$.

The command value correction unit 101 calculates the deviation of each of the plurality of frequencies $f_iac$ with respect to the calculated average value fac_ave, and inputs each of the calculated deviations to the integrator 103. The integrator 103 integrates each deviation, and outputs a value multiplied by a predetermined correction coefficient k as a frequency command value fac_cmd (denoted as $f_iac\_cmd$ in FIG. 18) of each of the power conversion devices $4i$ corresponding to each of the alternating-current wiring units $3i$. The frequency command value $f_iac\_cmd$ is input to the frequency target value calculation unit 74 of the voltage control type control device $17i$ or the frequency target value calculation unit 80 of the virtual synchronous generator model control type control device $17i$.

As shown in the above simulation, when the different loads 5 are connected to the respective alternating-current wiring units $3i$, the power conversion device $4i$ exchanges power between the alternating-current wiring units $3i$. As a result, the outputs of the generators $2i$ (generator active power) are not equal to one another and enter the steady state (see P11 and P21 in FIG. 13).

Therefore, in the present embodiment, the control devices $17i$ controls the respective power conversion devices $4i$ such that the frequencies fac of the alternating-current wiring units $3i$ in the steady state become equal to each other. The generator $2i$ has the first drooping characteristic in the relation of the generator active power to the frequency, and the control device $17i$ controls the power conversion device $4i$ such that the power conversion device $4i$ has the second drooping characteristic in the relationship of the power conversion device active power Pac to be output to the alternating-current wiring unit 3*i* with respect to the frequency fac. That is, by controlling the frequency fac in the alternating-current wiring unit 3*i*, the generator active power output from the generator 2*i* can be controlled. In this manner, according to the present embodiment, the outputs of the plurality of generators 2*i* can be balanced while appropriately exchanging the power between the plurality of wiring units 3*i*.

While in the present embodiment, an example has been given, in which the command value correction unit 101 is configured as a functional block of the higher-level control device 100 different from control device 17*i* that generates a target value of a control element, the present invention is not limited thereto. For example, the command value correction unit 101 may be provided in each of the control devices 17*i*. In this case, for example, it may be configured that the average value calculation unit 102 is provided in one of the plurality of control devices 17*i*, and the other control devices 17*i* calculate the frequency command value $f_i$ac_cmd based on the frequency average value input from the one control device.

It may also be configured that the command value correction unit 101 is provided only in one of the plurality of control devices 17*i*, and the other control devices 17*i* receive the corresponding frequency command value $f_i$ac_cmd calculated by the one control device.

In the present embodiment, as shown in FIG. 17, the frequency $f_i$ac of each of the alternating-current wiring units 3*i* is configured to be acquired from the corresponding control device 17*i*. Alternatively, it may be configured that the higher-level control device 100 acquires the frequency $f_i$ac of each of the alternating-current wiring units 3*i* based on the alternating-current voltage acquired from the alternating-current voltage measurement device 8 (the higher-level control device 100 includes the voltage/frequency/phase calculation unit 71).

The command value correction unit 101 in the present embodiment is also applicable to the current control type control device 17*i*. By appropriately setting the value of the correction coefficient k of the integrator 103, it is possible to make the output of each integrator 103 as the active power command value $P_i$ac_cmd.

Application Example 1

Hereinafter, some application examples of the power supply system 1, 1B in the above embodiments will be exemplified. Although the following application examples exemplify application examples of the power supply system 1 according to Embodiment 1, the present invention is similarly applicable to the power supply system 1B according to Embodiment 2.

First, a case where the power supply system 1 is applied as a power supply system for an aircraft will be described. A power supply system can be configured by applying an integrated drive generator (IDG) used as a generator for an aircraft as the two generators 21 and 22 as shown in FIG. 1. The IDG has a constant speed-drive unit (CSD, not shown) into which power from the main engine of the aircraft is input, and, regardless of the number of revolutions of the main engine, the rotational speed (frequency) of the generator can be maintained at a constant target value.

By building a power supply system using such an IDG as the generator 2*i* of the power supply system 1 in the above embodiment, it is possible to exchange power properly between the alternating-current wiring units 3*i* connected to each generator (IDG) 2*i*. It is possible to continue power supply to each wiring unit 3*i* when abnormality occurs in one generator 2*i* while executing the same control mode in each of the control devices 17*i* regardless of the presence or absence of abnormality of the generator 2*i* or the wiring unit 3*i*. It is possible not to affect other wiring units 3*i* when abnormality occurs in part of the wiring unit 3*i*.

When the power supply system 1 is applied to an actual system such as an aircraft, a circuit breaker (see breakers 111 to 114 in FIG. 19 described later) may be provided between the direct-current wiring unit 6 and the direct-current unit 4*id* of each of the power conversion devices 4*i*, and connection or disconnection of the plurality of generators 2*i* may be appropriately changed.

Application Example 2

FIG. 19 is a block diagram explaining one application example of the power supply system of Embodiment 1 to an aircraft. A power supply system 1C in FIG. 19 includes four generators 21, 22, 23, and 24 respectively connected to alternating-current wiring units 31, 32, 33, and 34. The same IDG as that of Application Example 1 is used as each of the generators 21 to 24. Furthermore, a direct-current wiring unit 61 is connected between a direct-current unit 41*d* of the power conversion device 41 to which the alternating-current wiring unit 31 is connected and a direct-current unit 42*d* of the power conversion device 42 to which the alternating-current wiring unit 32 is connected. A direct-current wiring unit 62 is connected between a direct-current unit 43*d* of a power conversion device 43 to which a wiring unit 33 is connected and a direct-current unit 44*d* of a power conversion device 44 to which an alternating-current wiring unit 34 is connected. These two direct-current wiring units 61 and 62 are connected to each other via a bypass circuit 63. The bypass circuit 63 is provided with a breaker 115. Moreover, the breaker 11*i* (111, 112, 113, and 114) is provided between the direct-current wiring units 61 and 62 and the direct-current unit 4*id* of each of the power conversion devices 4*i*.

Also in this application example, as in Application Example 1, the loads 5 of the four alternating-current wiring units 3*i* can be shared by up to four generators 2*i*. In addition, this suppresses voltage and frequency fluctuations at the time of sudden load change. Furthermore, even if any of the generators 2*i* is stopped, it is possible to continue the power supply to all the loads 5 by the other generators 2*i*. Furthermore, by switching the connection or disconnection of the bypass circuit 63 and/or each of the breakers 11*i*, it is possible to easily change the configuration of the power supply system 1C such as whether the load 5 connected to one alternating-current wiring unit 3*i* is handled by one generator 2*i* or by the plurality of generators 2*i*.

Application Example 3

FIG. 20 is a block diagram explaining one application example of the power supply system of Embodiment 1 to an aircraft. In a power supply system 1D in FIG. 20, auxiliary power units (APU) 22A and 24A are connected instead of the IDG in the generators 22 and 24 in Application Example 2. The generators 21 and 23 are configured as an IDG Although power conversion devices 42A and 44A similar to those of the above-described embodiments are connected to the auxiliary power units 22A and 24A, an alternating-current BUS and the load 5 are not connected between the auxiliary power units 22A and 24A and the power conversion devices 42A and 44A.

In this application example, IDGs 21 and 23 supply power to the loads 5 respectively connected to the alternating-current wiring units 31 and 33. While the IDGs 21 and 23 are stopped, the APUs 22A and 24A continuously supply power to the alternating-current wiring units 31 and 33 for the loads 5 connected to the corresponding alternating-current wiring units 31 and 33. Also, by closing the breaker 115 of the bypass circuit 63, it is possible to supply power from the IDG 21 and/or the APU 22A to the load 5 connected to the alternating-current wiring unit 33, and it is possible to supply power from the IDG 23 and/or the APU 24A to the load 5 connected to the alternating-current wiring unit 31.

In the conventional split method, when the main engine is started, the IDGs 21 and 23 may be started by starting the main engine in a state where power is supplied to the load 5 using the APUs 22A and 24A, and a control of switching the power supply source to the load 5 from the APUs 22A and 24A to the IDGs 21 and 23 may be performed. The reverse control may be performed when stopping the main engine. When switching of generators and the like is performed, an extra operation such as uninterrupted switching has been required conventionally. However, application of the power supply system in the above embodiment facilitates operations at the time of main engine start and stop.

Application Example 4

FIG. 21 is a block diagram explaining one application example of the power supply system of Embodiment 1 to a hybrid propulsion vessel. In a power supply system 1E in this application example, an equivalent of the generator 21 in the power supply system 1 shown in FIG. 1 is a diesel generator, and the generator 22 is a gas turbine power facility. Furthermore, in the power supply system 1E, a transformer 120 is provided between the alternating-current wiring unit 32 to which the generator 22 is connected and the power conversion device 42. The hybrid propulsion vessel uses a diesel generator 21 with a capacity smaller than that of the generator 22 and the alternating-current wiring unit 31 mainly as an inboard power system, and uses a gas turbine power facility 22 with a capacity large than that of the generator 21 and the alternating-current wiring unit 32 mainly as a propulsion assistance. Also in the power supply system 1E having such different types of generators 21 and 22, it is possible to exchange power between the two alternating-current wiring units 31 and 32 in accordance with the operation state. This can raise the degree of freedom of the operation method such as stopping one of the generators 21 and 22 in the hybrid propulsion vessel.

As in this application example, the transformer 120 as described is provided when the power supply system of the above embodiments is applied to different types of the generators 21 and 22 and when a difference is large in capacity between the generators 21 and 22. For example, when the rated voltage of the generator 21 is 450V and the rated voltage of the generator 22 is 6.6 kV, the transformer 120 is configured such that the generator 22 outputs and the voltage of the alternating-current wiring unit 32 is stepped down to approximately the same voltage as the rated voltage of the generator 21. This can prevent an increase in the difference between the alternating-current voltages Vac that the power conversion devices 41 and 42 output to the alternating-current wiring units 31 and 32.

Other Variations

Although embodiments of this invention are described above, this invention is not limited to the embodiments above and various improvements, alterations, and modifications are possible in the range not departing from the scope of the inventions.

For example, although the above-mentioned embodiments explain a case where alternating-current wiring unit 3i to which a power supply system is applied is a three phase system, it is not restricted to this. For example, even when the alternating-current wiring unit 3i is a single-phase two-wire system or a single-phase three-wire system, a similar power supply system can be built except that the method of various calculations differs depending on the system.

In the above embodiments, an example in which one generator 2i is connected to one alternating-current wiring unit 3i is described, but two or more generators 2i may be connected to one alternating-current wiring unit 3i.

Although the application examples described above are mainly applicable to aircrafts or hybrid propulsion vessels, the power supply systems of the above embodiments can be preferably applied to any power supply system provided with a plurality of generators. For example, the power supply system of the above embodiment can be applied to a mobile power supply system such as a normal ship, a private power generation system, and the like.

INDUSTRIAL APPLICABILITY

The present invention is useful in a power supply system in which a plurality of wiring units each including at least one generator are connected to one another, the power supply system continues power supply to each wiring unit when an abnormality occurs in one generator, and does not affect other wiring units when an abnormality occurs in part of the wiring units.

REFERENCE SIGNS LIST

1, 1B Power supply system
2i(i=1, 2, . . . ) Generator
3i Alternating-current wiring unit
4i Power conversion device
6, 61, 62 Direct-current wiring unit
17i Control device
74, 80 Frequency target value calculation unit
75 Alternating-current voltage target value calculation unit
77 Active power target value calculation unit
78 Reactive power target value calculation unit
101 Command value correction unit

The invention claimed is:

1. A power supply system with a plurality of generators, the power supply system comprising:
   a plurality of alternating-current wiring units respectively connected to the plurality of generators;
   a plurality of power conversion devices respectively connected to the plurality of alternating-current wiring units;
   a direct-current wiring unit connecting the plurality of power conversion devices to one another; and
   a control device that performs power conversion control between a corresponding alternating-current wiring unit and the direct-current wiring unit by transmitting a drive signal to the plurality of power conversion devices,
   wherein:
   each of the plurality of generators is configured such that a relationship of frequency with respect to a generator active power output by each generator to the corresponding alternating-current wiring unit has a predetermined first drooping characteristic;

the plurality of power conversion devices is configured to convert alternating-current power input through each alternating-current wiring unit into direct-current power, and to convert direct-current power input through the direct-current wiring unit into alternating-current power;

the control device is configured to determine a target value of a control element such that a relationship of frequency with respect to a power conversion device active power output by each power conversion device to the corresponding alternating-current wiring unit has a predetermined second drooping characteristic, and is configured to generate the drive signal for each power conversion device by correcting the target value of the control element in response to direct-current voltage at the direct-current wiring unit;

the target value of the control element is
  a frequency target value set such that the frequency decreases in accordance with the second drooping characteristic when power consumption of a load connected to the alternating-current wiring unit increases, and the frequency increases in accordance with the second drooping characteristic when the power consumption of the load decreases, or
  an active power target value set such that the power conversion device active power increases in accordance with the second drooping characteristic when frequency in the alternating-current wiring unit decreases due to an increase in the power consumption of the load connected to the alternating-current wiring unit, and the power conversion device active power decreases in accordance with the second drooping characteristic when the frequency in the alternating-current wiring unit increases due to a decrease in the power consumption of the load;

when the direct-current voltage decreases, the control device corrects the frequency target value or the active power target value such that the power conversion device active power decreases, and when the direct-current voltage increases, the control device corrects the frequency target value or the active power target value such that the power conversion device active power increases; and each power conversion device outputs the power conversion device active power corresponding to the frequency target value or the active power target value to the corresponding alternating-current wiring unit.

2. The power supply system according to claim 1, wherein the control device is configured to determine the target value of the control element such that a relationship of alternating-current voltage with respect to a power conversion device reactive power that each power conversion device outputs to the corresponding alternating-current wiring unit has a predetermined third drooping characteristic.

3. The power supply system according to claim 1, wherein the control device includes a frequency target value calculation unit that calculates the frequency target value by a frequency target value calculation process including a calculation of multiplying a value based on a deviation of the power conversion device active power with respect to a predetermined active power command value by a coefficient indicating the second drooping characteristic.

4. The power supply system according to claim 3, wherein the frequency target value calculation unit calculates a frequency reference value obtained by multiplying a value based on a deviation of the power conversion device active power with respect to the active power command value by a coefficient indicating the second drooping characteristic, calculates a frequency correction value obtained by multiplying a deviation of the direct-current voltage with respect to a predetermined direct-current voltage command value by a predetermined correction coefficient, and calculates the frequency target value obtained by adding the frequency reference value and the frequency correction value to a predetermined frequency command value.

5. The power supply system according to claim 3, wherein the frequency target value calculation unit calculates an active power correction value obtained by multiplying a deviation of the direct-current voltage with respect to a predetermined direct-current voltage command value by a predetermined correction coefficient, and performs a calculation of multiplying a value obtained by adding the active power correction value to a deviation of the power conversion device active power with respect to the active power command value by a coefficient indicating the second drooping characteristic.

6. The power supply system according to claim 1, wherein the control device includes an active power target value calculation unit that calculates the active power target value by an active power target value calculation process including a calculation of multiplying a value based on a deviation of the frequency with respect to a predetermined frequency command value by a coefficient indicating the second drooping characteristic.

7. The power supply system according to claim 6, wherein the active power target value calculation unit calculates an active power reference value obtained by multiplying a value based on a deviation of the frequency with respect to the frequency command value by a coefficient indicating the second drooping characteristic, calculates an active power correction value obtained by multiplying a deviation of the direct-current voltage with respect to a predetermined direct-current voltage command value by a predetermined correction coefficient, and calculates the active power target value obtained by adding the active power reference value and the active power correction value to a predetermined active power command value.

8. The power supply system according to claim 2, wherein the control device includes an alternating-current voltage target value calculation unit that calculates an alternating-current voltage target value by an alternating-current voltage target value calculation process including a calculation of multiplying a value based on a deviation of the power conversion device reactive power with respect to a predetermined reactive power command value by a coefficient indicating the third drooping characteristic.

9. The power supply system according to claim 2, wherein the control device includes a reactive power target value calculation unit that calculates a reactive power target value by a reactive power target value calculation process including a calculation of multiplying a value based on a deviation of the alternating-current voltage with respect to a predetermined alternating-current voltage command value by a coefficient indicating the third drooping characteristic.

10. The power supply system according to claim 1, wherein the control device includes a command value correction unit that corrects a command value of the control element serving as a reference of a target value of the control element based on a value obtained by averaging the frequencies of the plurality of alternating-current wiring units such that an output of each generator becomes equal to each other.

* * * * *